United States Patent
Edmiston et al.

(10) Patent No.: US 9,483,209 B2
(45) Date of Patent: Nov. 1, 2016

(54) INTERFACE SYSTEM AND METHOD

(71) Applicants: Graham Edmiston, Bridge of Weir (GB); Heinz Klaus Richard Wrobel, Gauting (DE)

(72) Inventors: Graham Edmiston, Bridge of Weir (GB); Heinz Klaus Richard Wrobel, Gauting (DE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 151 days.

(21) Appl. No.: 14/492,601

(22) Filed: Sep. 22, 2014

(65) Prior Publication Data

US 2016/0085479 A1    Mar. 24, 2016

(51) Int. Cl.
*H04J 3/06*    (2006.01)
*G06F 3/06*    (2006.01)

(52) U.S. Cl.
CPC ............ *G06F 3/0659* (2013.01); *G06F 3/061* (2013.01); *G06F 3/0683* (2013.01)

(58) Field of Classification Search
CPC ..... G06F 3/0659; G06F 3/061; G06F 3/0683
USPC .......................... 370/503, 509, 510
See application file for complete search history.

(56) References Cited

U.S. PATENT DOCUMENTS

| | | | |
|---|---|---|---|
| 4,672,606 A * | 6/1987 | Bourgonje | H04L 12/4035 370/445 |
| 6,370,159 B1 | 4/2002 | Eidson | |
| 2004/0213169 A1 * | 10/2004 | Allard | G06K 7/10297 370/276 |
| 2010/0254225 A1 | 10/2010 | Schweitzer, III et al. | |
| 2012/0014377 A1 | 1/2012 | Joergensen et al. | |
| 2013/0012347 A1 | 1/2013 | Ortmann et al. | |
| 2013/0013952 A1 | 1/2013 | Gotz et al. | |
| 2013/0034197 A1 | 2/2013 | Aweya et al. | |
| 2013/0044756 A1 * | 2/2013 | Fourcand | H04L 12/43 370/395.42 |
| 2013/0100832 A1 * | 4/2013 | Flinn | H04L 43/0852 370/252 |
| 2013/0163617 A1 | 6/2013 | Chandra et al. | |
| 2015/0222533 A1 * | 8/2015 | Birrittella | H04L 45/66 370/392 |

* cited by examiner

*Primary Examiner* — Chuong T Ho

(57) ABSTRACT

An interface system has a first media access controller having a first MAC buffer for storing at least one first-type frame in a first frame format according to a first communication protocol. A time synchronization module is arranged to, upon detecting the start of the first-type frame, determine a first timestamp from a master clock signal and latch the first timestamp into a first timestamp register. A processor is arranged to: retrieve the first timestamp from the first timestamp register, and transfer a first-type frame between the first MAC buffer and a first local memory in a block-wise manner as a plurality of blocks. The processor is arranged to process the plurality of blocks of the first-type frame using the first timestamp as retrieved from the first timestamp register.

18 Claims, 10 Drawing Sheets

INTERFACE SYSTEM AND METHOD

FIELD OF THE INVENTION

This invention relates to an interface system, a time synchronization module, an interfacing method, a computer program product and a non-transitory tangible computer readable storage medium.

BACKGROUND OF THE INVENTION

In many systems, an interface system interfaces a first system component or first network to one or more other system components and/or one or more other networks in different time domains. The interface system hereby allows to communicate between the different system components or networks. Communication may include data communication, control data communication or both. The different system components or network may be homogeneous and run the same protocols but in different time domains, e.g., on different clocks, phases and/or frequencies. The different system components or network may be heterogeneous and run different protocols in different time domains. The first system component in a first network may for example control other heterogeneous networks and protocols concurrently via the interface system. For coupling of the time domain over differing port types, prior art systems use dedicated hardware externally or embedded within each port, and complex software to control and synchronize. As an example, for some prior art systems, transmission of time synchronization information relies on dedicated, protocol specific hardware within the MAC of an interface device to parse an outgoing frame and to insert the time stamp into the frame at a protocol defined offset. Some prior art systems hereto use complex interworking schemes and/or additional Ethernet ports to connect and synchronize non-native Ethernet network segments to the system to allow the system to communicate.

SUMMARY OF THE INVENTION

The present invention provides an interface system, a time synchronization module, an interfacing method, a computer program product and a non-transitory tangible computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In the following, for sake of understanding, the circuitry is described in operation where that is considered most appropriate. However, it will be apparent that the respective elements are arranged to perform the functions being described as performed by them.

Figure 1A:
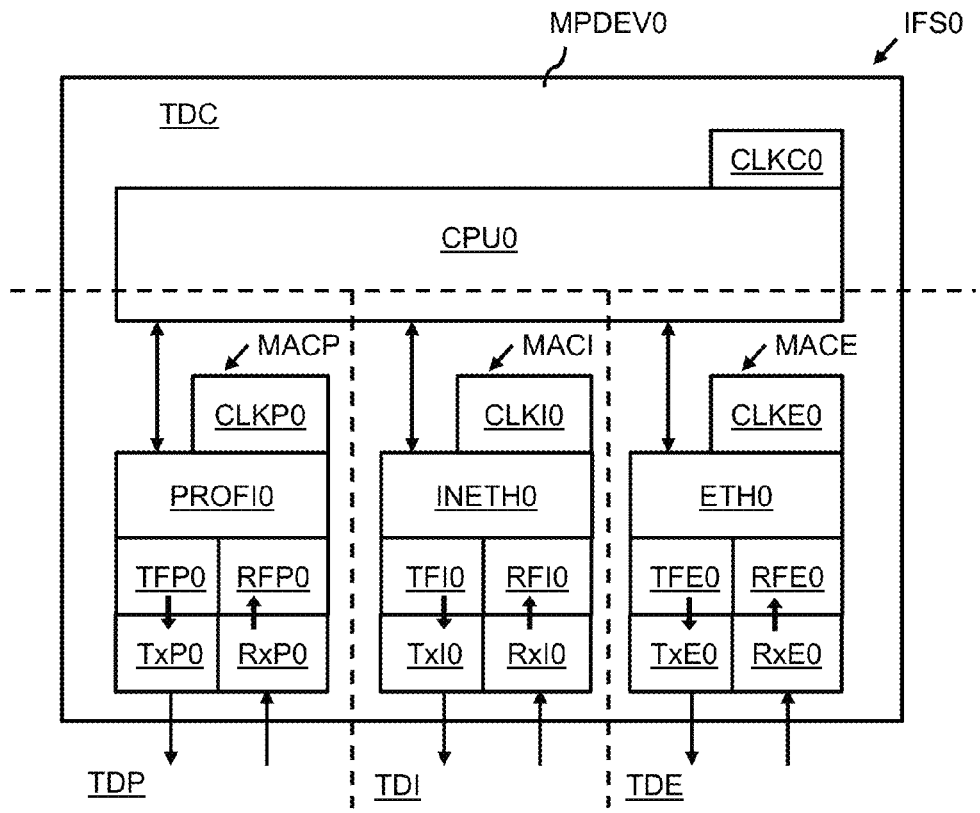
FIG. 1a schematically shows an example of a prior art interface system.

FIG. 1a schematically shows an example of a prior art interface system IFS0, and more particularly of a prior art multi-port interface device MPDEV0 forming such interface system IFS0.

The prior art multi-port interface device MPDEV0 comprises an interface supporting a plurality of protocols. The prior art multi-port interface device MPDEV0 comprises an Ethernet media access controller MACE, an Industrial Ethernet media access controller MACI, a PROFIBUS media access controller MACP, and a processor CPU0.

The Ethernet media access controller MACE provides a first communication interface over a first port RxE0, TxE0 using first-type frames according to a first communication protocol. The first port RxE0, TxE0 has a first receive port RxE0 and a first transmit port TxE0. The first communication protocol is an Ethernet protocol. The first communication is associated with an Ethernet time domain TDE and an Ethernet time domain clock device CLKE0 of the Ethernet media access controller MACE. The Ethernet media access controller MACE has a first MAC receive buffer RFE0 for storing at least one first-type frame as received in a first frame format according to the first communication protocol, and a first MAC transmit buffer TFE0 for storing at least one first-type frame for transmission in a first frame format according to the first communication protocol. The first MAC receive buffer RFE0 and the first MAC transmit buffer TFE0 are implemented as FIFOs. The Ethernet media access controller MACE has an Ethernet MAC processor ETH0 arranged to control the operation of the Ethernet media access controller MACE. The Ethernet MAC processor ETH0 determines protocol specific timestamp information from a clock signal provided by the Ethernet time domain clock device CLKE0, and comprises dedicated hardware to insert the timestamp at a protocol specific offset into the first-type frame when the first-type frame is transmitted from the first MAC transmit buffer TFE0 after being parsed from the processor CPU0 through the Ethernet MAC processor ETH0 for writing into the first MAC transmit buffer TFE0.

The Industrial Ethernet media access controller MACI provides a second communication interface over a second port RxI0, TxI0 using second-type frames according to a second communication protocol. The second port RxI0, TXI0 has a second receive port RxI0 and a second transmit port TxI0. The second communication protocol is an Industrial Ethernet protocol. The second communication is associated with an Industrial Ethernet time domain TDI. The Industrial Ethernet media access controller MACI has a second MAC receive buffer RFI0 for storing at least one second-type frame as received in a second frame format according to the second communication protocol and a second MAC transmit buffer TFI0 for storing at least one second-type frame for transmission in a second frame format according to the second communication protocol. The second MAC receive buffer RFI0 and the second MAC transmit buffer TFI0 are implemented as FIFOs.

The PROFIBUS Ethernet media access controller MACP provides a third communication interface over a third port RxP0, TxP0 using third-type frames according to a third communication protocol. The third port RxP0, TxP0 has a third receive port RxP0 and a third transmit port TxP0. The third communication protocol is a PROFIBUS protocol. The third communication interface is associated with a PROFIBUS time domain TDP. The PROFIBUS access controller MACP has a third MAC receive buffer RFP0 for storing at least one third-type frame as received in a third frame format according to the third communication protocol and a third MAC transmit buffer TFP0 for storing at least one third-type frame for transmission in a third frame format according to the third communication protocol. The third MAC receive buffer RFP0 and the third MAC transmit buffer TFP0 are implemented as FIFOs.

For transmitting an Ethernet frame, the processor CPU0 is arranged to read an Ethernet frame from a local memory and to write the frame into the first MAC transmit buffer TFE0 of the Ethernet media access controller MACE via the Ethernet MAC processor ETH0. Herein, the Ethernet MAC processor ETH0 signals to the dedicated hardware to insert the timestamp at a protocol specific offset into Ethernet when the Ethernet frame is transmitted from the first MAC transmit buffer TFE0. In another prior art implementation, for example in case of an IEEE 1588-type frame, the dedicated hardware parses the frame and signals to itself to insert the timestamp at a protocol specific offset within the frame. The Ethernet media access controller MACE then transmits the Ethernet frame via the first transmit port TxE0, captures the timestamp when transmission of the frame begins, when it reaches the protocol specific offset the dedicated hardware inserts the timestamp into the frame. In another prior art implementation for transmitting an Ethernet frame, the processor CPU0 is arranged to read an Ethernet frame from a local memory and to write the frame into the first MAC transmit buffer TFE0 of the Ethernet media access controller MACE via the Ethernet MAC processor ETH0. Herein, the Ethernet MAC processor ETH0 inserts the timestamp at a protocol specific offset into Ethernet when the Ethernet frame is written into the first MAC buffer TFE0.

For receiving an Ethernet frame, the processor CPU0 is arranged to read an Ethernet frame from the first MAC transmit buffer TFE0 of the Ethernet media access controller MACE via the Ethernet MAC processor ETH0 and to write the frame into its local memory, from where it is available for further processing. Herein, the Ethernet MAC processor ETH0 may retrieve or provide a timestamp in the Ethernet time domain TDE. The processor CPU0 is connected to a processor clock unit CLKC0 arranged to provide a processor clock signal, whereby the processor is operated in a processor time domain TDC.

Transmission and receipt of Industrial Ethernet frames by the Industrial Ethernet media access controller MACI works in a similar manner, wherein an Industrial Ethernet MAC processor INETH0 of the Industrial Ethernet media access controller MACI provides for handling Industrial Ethernet timestamp information using dedicated hardware and an Industrial Ethernet time domain clock device CLKI0. Transmission and receipt of PROFIBUS frames by the PROFIBUS media access controller MACP works in a similar manner, wherein a PROFIBUS MAC processor provides for handling PROFIBUS timestamp information using dedicated hardware and a PROFIBUS time domain clock device CLKP0.

The prior art multi-port interface device MPDEV0 thus comprises many different time domains, each needing synchronization. Each of the media access controllers MACE, MACI, MACP has its proprietary time synchronization hardware and further requirements for transferring the different frames for each of the protocols supported.

Figure 1B:
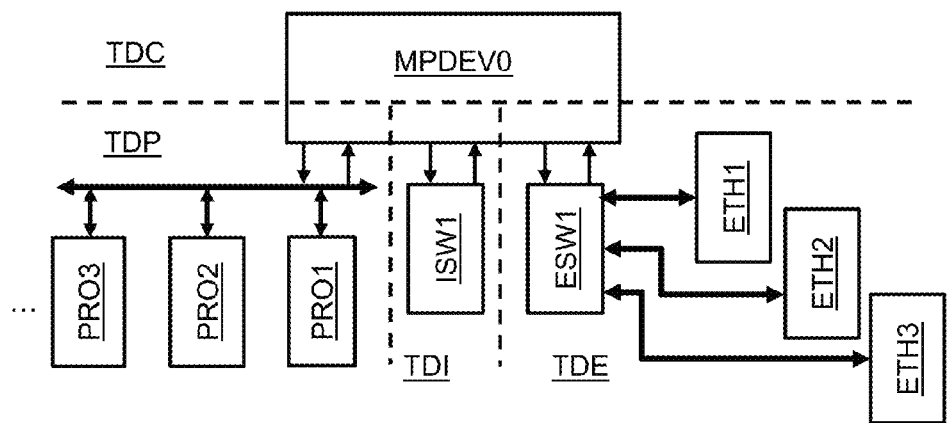
FIG. 1b schematically shows a prior art heterogeneous network.

FIG. 1b schematically shows a prior art heterogeneous network. The prior art multi-port interface device MPDEV0 connects a plurality of PROFIBUS systems PRO1, PRO2, PRO3 in a PROFIBUS Time Domain TDP and an Industrial Ethernet network ISW1 in an Industrial Time Domain TDI. The prior art multi-port interface device MPDEV0 is further connected to a plurality of Ethernet networks ETH1, ETH2, ETH3 in an Ethernet Time Domain TDE via an Ethernet Switch ESW1.

Figure 2A:
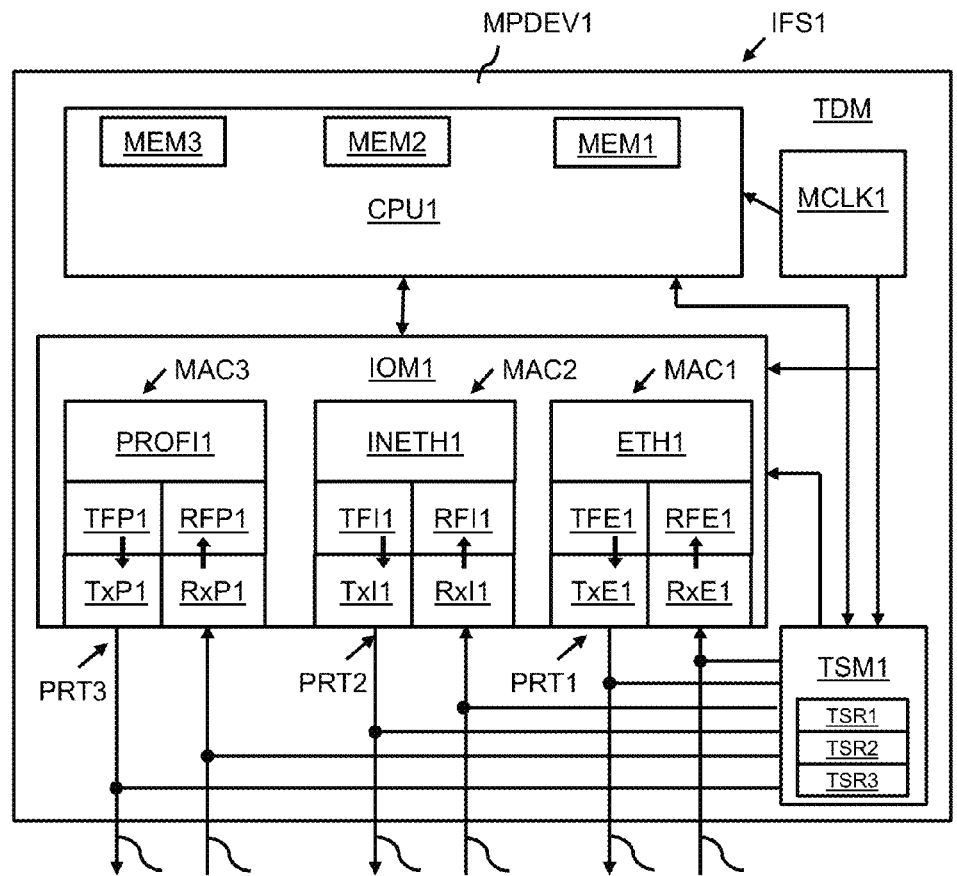
FIG. 2a schematically shows an example of an embodiment of an interface system.

FIG. 2a schematically shows an example of an embodiment of an interface system IFS1. The interface system IFS1 comprises an interface device MPDEV1. The interface device MPDEV1 comprises a first media access controller MAC1 for providing a first communication interface over a first port PRT1 using first-type frames according to a first communication protocol. The interface device MPDEV1 further comprises a second media access controller MAC2 for providing a second communication interface over a second port PRT2 using second-type frames according to a second communication protocol and a third media access controller MAC3 for providing a third communication interface over a third port PRT3 using third-type frames according to a third communication protocol. In the example shown in FIG. 2a, the first port PRT1 is connected to a first external bus comprising a first transmit line ETB and a first receipt line ERB, to a second external bus comprising a second transmit line ITB and a second receipt line IRB, and to a third external bus comprising a third transmit line PTB and a third receipt line PRB. The interface device MPDEV1 may be referred to as a multi-port interface device, or, briefly, as a multi-port device. In the example shown, the first media access controller MAC1, the second media access controller MAC2 and the third media access controller MAC3 are arranged in a part of the multi-port device referred to as an I/O module IOM1. In alternative embodiments, the I/O module may be provided as a device separate from one or more other parts of the interface system IFS1, such as separate from the processor CPU1.

The interface device MPDEV1 further comprises a time synchronization module TSM1. In alternative embodiments, e.g. as described in FIG. 3, the time synchronization module may be provided external to the interface device, and the interface device is arranged to cooperate with the time synchronization module.

The interface device MPDEV1 further comprises a master clock unit MCLK1. In this example, the master clock unit MCLK1 is provided as a separate unit within the interface device MPDEV1. In alternative embodiments, the master clock unit may be provided as an integrated part within one of the first, second and third media access controllers, or as an integrated part within the processor. In alternative embodiments, e.g. as described in FIG. 3, the master clock unit may be provided external to the interface device, and the interface device is arranged to cooperate with the master clock unit.

The interface device MPDEV1 further comprises a processor CPU1. In alternative embodiments, e.g. as described in FIG. 3, the processor may be provided external to the interface device, and the interface device is arranged to cooperate with the processor.

In the example shown, the multi-port interface device MPDEV1 comprises an Ethernet media access controller MAC1 as the first media access controller, an Industrial an Ethernet media access controller MAC2 as the second media access controller and a PROFIBUS media access controller MAC3 as the third media access controller. The first communication protocol, the second communication protocol and the third protocol are thus different communication protocols, and the multi-port interface device may be referred to as a heterogeneous interface device. In alternative embodiments, the first communication protocol, the second communication protocol and the third protocol may be the same communication protocol, and multi-port interface device may be referred to as a homogeneous interface device. In further embodiments, homogenous ports may be provided with heterogeneous layer 2 protocols. For example, a multi-port interface device may provide for a standard Ethernet interface for networking and another Ethernet interface running an industrial Ethernet protocol, thereby providing homogenous ports and heterogeneous layer 2 protocols. As another alternative, homogenous ports and a homogenous layer 2 protocol may be used with differing protocols at a higher layer, e.g., an interface may be provided over Ethernet at a higher layer, e.g. NTP, 1588, TCP.

In the example shown in FIG. 2a, each of the first, second and third media access controllers is arranged to receive and transmit frames according to respective first, second and third communication protocols. In the example shown, each of the respective ports comprises a transmit port and a receipt port. Thus, the first port comprises a first transmit port TxE1 and a first receipt port RxE1, the second port comprises a second transmit port TxI1 and a second receipt port RxI1, and the third port comprises a third transmit port TxP1 and a third receipt port RxP1. In other embodiments, one or more of the media access controllers may have only a transmit port, e.g., where the interface device provides a data source for data according to the associated protocol, or only a receipt port. In another embodiment, one of the media access controllers only has a receipt port and another one of the media access controllers only has a transmit port, e.g., such as to transform data received in frames according to a first type protocol into data to be transmitted in frames according a second type protocol, such as a USB to Ethernet conversion. In again other embodiments, one or more of the media access controllers may have a plurality of transmit ports or a plurality of receipt ports, e.g., such as provide an increased bandwidth by providing parallel ports.

The first media access controller MAC1 thus has a first port over which a first communication interface using first-type frames according to a first communication protocol can be provided. The first media access controller MAC1 has a first MAC buffer RFE1; TFE1 for storing at least one first-type frame in a first frame format according to the first communication protocol. In the example shown, the first MAC buffer comprises a first MAC transmit buffer TFE1, which may be implemented as a FIFO register, and a first MAC receipt buffer RFE1, which may be implemented as another FIFO register. The first media access controller MAC1 has a first MAC processor ETH1 arranged to control the operation of the first media access controller MAC1. The first MAC processor ETH1 is arranged to cooperate with the first MAC transmit buffer TFE1 to inform the processor CPU1 for data to be transmitted when there is sufficient space in the first MAC transmit buffer TFE1 to store a new first-type frame. The first MAC processor ETH1 is arranged to cooperate with the first MAC receipt buffer RFE1 to inform the processor CPU1 to read data from the first MAC receipt buffer when data is received in the first MAC receipt buffer and available to be read from the first MAC receipt buffer. Informing the processor may be done using one or more registers indicating a read and/or a write pointer or by any other type of request. In another example, the first media access controller MAC1 is arranged for transmission only and the first MAC buffer consists of only a first MAC transmit buffer TFE1. In again another example, the first media access controller MAC1 is arranged for receipt only and the first MAC buffer consists of only a first MAC receipt buffer RFE1, The second media access controller MAC2 thus has a second port PRT2 over which a second communication interface using second-type frames according to a second communication protocol can be provided. The second media access controller MAC2 has a second MAC buffer RFI1; TFI1 for storing at least one second-type frame in a second frame format according to the second communication protocol. In the example shown, the second MAC buffer comprises a second MAC transmit buffer TFI1, which may be implemented as a FIFO register, and a second MAC receipt buffer RFI1, which may be implemented as another FIFO register. The second media access controller MAC2 has a second MAC processor INETH1 arranged to control the operation of the second media access controller MAC2 in a similar manner as described above for the first MAC processor ETH1. In another example, the second media access controller MAC2 is arranged for transmission only and the second MAC buffer consists of only a second MAC transmit buffer TFI1. In again another example, the second media access controller MAC2 is arranged for receipt only and the second MAC buffer consists of only a second MAC receipt buffer RFI1, The third media access controller MAC3 thus has a third port PRT3 over which a third communication interface using third-type frames according to a third communication protocol can be provided. The third media access controller MAC3 has a third MAC buffer RFP1; TFP1 for storing at least one third-type frame in a third frame format according to the third communication protocol. In the example shown, the third MAC buffer comprises a third MAC transmit buffer TFP1, which may be implemented as a FIFO register, and a third MAC receipt buffer RFP1, which may be implemented as another FIFO register. The third media access controller MAC3 has a third MAC processor PROFI1 arranged to control the operation of the third media access controller MAC3 in a similar manner as described above for the first MAC processor ETH1. In another example, the third media access controller MAC3 is arranged for transmission only and the third MAC buffer consists of only a third MAC transmit buffer TFP1. In again another example, the third media access controller MAC2 is arranged for receipt only and the third MAC buffer consists of only a third MAC receipt buffer RFP1.

In the example, the first MAC processor ETH1, the second MAC processor INETH1 and the third MAC processor PROFI1 are shown as separate processors, but in other examples, the first MAC processor ETH1, the second MAC processor INETH1 may be integrated into a single processor or their functions may be distributed over two or more processors.

The time synchronization module TSM1 is arranged to detect a start of a first-type frame provided to the first media access controller MAC1. Examples will be described below with reference to FIG. 8-FIG. 10.

Detecting the start of the first-type frame may be performed by detecting receipt of the start of the first-type frame by the first media access controller MAC1. For example, in receiving frames, the time synchronization module TSM1 may be arranged to detect a start of receiving a first-type frame from an external first-type device or system by the first media access controller MAC1. For example, in transmitting frames, the time synchronization module TSM1 may be arranged to detect a start of receipt of a first-type frame by the first media access controller MAC1 when the first-type frame is received by the first media access controller MAC1 from the processor CPU1. The TSM may hereby effectively detect when the first block of the frame is written into the first MAC transmit buffer TFE1 by processor CPU1. In transmitting frames, the time synchronization module TSM1 may hereby, in an embodiment, be arranged to detect a start of writing a first block of a first-type frame by the processor CPU1 into the first transmit buffer TFE1 of the first media access controller MAC1.

Detecting the start of the first-type frame may be performed by detecting receipt of the start of the first-type frame by the first port of the first media access controller MAC1. For example, in receiving frames, the time synchronization module TSM1 may be arranged to detect a start of receiving a first-type frame by the first receipt port RxE1 of the first media access controller MAC1. The time synchronization module TSM1 may hereby effectively detect when the start of the frame is provided to the first media access controller MAC1 for receipt. For example, in transmitting frames, the time synchronization module TSM1 may be arranged to detect a start of receipt of a first-type frame by the first transmit port TxE1 of the first media access controller MAC1 when the first-type frame is transferred from the first MAC transmit buffer TFE1 to the first transmit port TxE1 via a physical layer bus in the first media access controller MAC1. In transmitting frames, the time synchronization module TSM1 may hereby be arranged to, in detecting a start of the first-type frame, detect a providing of the start of first-type frame to the first port of the first media access controller MAC1.

The time synchronization module TSM1 may hereby effectively detect when the first block of the frame leaves the first MAC transmit buffer TFE1 for actual transmission.

In an embodiment, the first media access controller MAC1 comprises a first physical layer bus. The first physical layer bus connects the first MAC buffer to the first port and is arranged to transfer data between the first MAC buffer to the first port. The first physical layer bus may connect the first MAC transmit buffer TFE1 to the first transmit port TxE1 and be arranged to transfer data from the first MAC transmit buffer TFE1 to the first transmit port TxE1 and/or may connect the first MAC receive buffer TRE1 to the first receipt port RxE1 and be arranged to transfer data from the first receipt port RxE1 to the first MAC receive buffer TRE1. A single first physical layer bus may connect the first MAC transmit buffer TFE1 to the first transmit port TxE1 and the first MAC receive buffer TRE1 to the first receipt port RxE1. Alternatively, two dedicated first physical layer busses may be used: a first transmit physical layer bus connecting the first MAC transmit buffer TFE1 to the first transmit port TxE1 and a first receipt physical layer bus the first MAC receive buffer TRE1 to the first receipt port RxE1. The first physical layer bus may also be connected to the time synchronization module TSM1, to provide the time synchronization module TSM1 with physical layer bus signals. Hereby, the time synchronization module TSM1 may be arranged to inspect data transfers over the first physical layer bus, and use physical layer bus signals for detection of a transfer of a start of a first-type frame In another embodiment, the time synchronization module TSM1 is connected to the first external bus. In the example show in FIG. 2a, the time synchronization module TSM1 is connected to the first transmit line ETB and the first receipt line ERB. Hereby, the time synchronization module TSM1 may be arranged to inspect data transfers over the first external bus, and use data bus signals for detection of a transfer of a start of a first-type frame. For example, the time synchronization module TSM1 may be arranged to inspect data transfers over the first transmit line ETB, and use data bus signals on the first transmit line ETB for detection of a start of transmission of a first-type frame. For example, the time synchronization module TSM1 may be arranged to inspect data transfers over the first receipt line ERB, and use data bus signals on the first receipt line ERB for detection of a start of receipt of a first-type frame.

The time synchronization module TSM1 is further arranged to, upon detecting the start of the first-type frame, determine a first timestamp from a master clock signal provided from the master clock unit MCLK1 and to latch the first timestamp into a first timestamp register TSR1 in the time synchronization module TSM1. The time synchronization module TSM1 is further arranged to keep the first timestamp in the first timestamp register at least until a start of a next first-type frame is detected. In embodiments where the first media access controller MAC1 comprises a first physical layer bus and the time synchronization module TSM1, the physical layer bus signals may be used by the time synchronization module TSM1 to latch the first timestamp into the first timestamp register.

In a similar manner, the time synchronization module TSM1 is arranged to detect a start of a second-type frame provided to the second media access controller MAC2, and to, upon detecting the start of the second-type frame, determine a second timestamp from the master clock signal provided from the master clock unit MCLK1, to latch the second timestamp into a second timestamp register TSR2 in the time synchronization module TSM1, and to keep the second timestamp in the second timestamp register at least until a start of a next second-type frame is detected.

In a similar manner the time synchronization module TSM1 is arranged to detect a start of a third-type frame provided to the third media access controller MAC3, and to, upon detecting the start of the third-type frame, determine a third timestamp from the master clock signal provided from the master clock unit MCLK1, to latch the third timestamp into a third timestamp register TSR3 in the time synchronization module TSM1, and to keep the third timestamp in the third timestamp register at least until a start of a next third-type frame is detected.

The processor CPU1 has a local memory comprising a first local memory MEM1 having a capacity for storing one or more first-type frames and associated control data. In the example shown in FIG. 2a, the local memory further has a second local memory MEM2 for storing one or more second-type frames and a third local memory MEM3 for storing third-type frames. One or more of the first, second and third local memories MEM1, MEM2, MEM3 may comprise respective transmit and receipt memory parts for storing one or more respective frames for transmission or as received according to the respective protocol. The processor CPU1 is arranged to retrieve the first timestamp from the first timestamp register TSR1 from the time synchronization module TSM1. The processor CPU1 is further arranged to transfer a first-type frame between the first MAC buffer RFE1; TFE1 and the first local memory MEM1 in a block-wise manner. The first-type frame is hereby copied as a plurality of blocks. For receiving a first-type frame, transferring the first-type frame between the first MAC buffer and the first local memory may comprise reading from the first MAC buffer and writing into the first local memory. For transmitting a first-type frame, transferring the first-type frame between the first MAC buffer and the first local memory may comprise reading from the first local memory and writing into the first MAC buffer. The processor CPU1 is arranged to process the plurality of blocks of the first-type frame using the first timestamp as retrieved from the first timestamp register. By using the first timestamp, the processor CPU1 thus processes blocks of the first-type frame in a time domain associated with the master clock. Transferring the blocks may comprise part of the processing. For example, where a block of the plurality of blocks comprises a first-protocol specific timestamp-dependent information, the transferring may comprise processing the block to replace the first-protocol specific timestamp-dependent information in the block by the first-protocol specific timestamp-dependent information formatted in dependence on at least the first communication protocol and the first time stamp. Thus, blocks of a first-type frame without first-protocol specific timestamp-dependent information may be copied as they are, whereas blocks of a first-type frame with first-protocol specific timestamp-dependent information may be copied with the first-protocol specific timestamp-dependent information formatted in dependence on at least the first communication protocol and the first time stamp. Formatting in dependence on at least the first communication protocol and the first time stamp may e.g. comprise providing the first time stamp in the block, where a block comprises data positions for accommodating timestamp data. Formatting in dependence on at least the first communication protocol and the first time stamp may e.g. comprise recalculating a check sum in a block that is copied, where the check sum dependents on the timestamp data in the same or another block of the frame. Formatting in dependence at least on the first communication protocol and the first time stamp may e.g. comprise adding a first protocol-dependent offset and/or first protocol-dependent scaling to the first time stamp as retrieved from the master clock signal. Formatting in dependence on at least the first communication protocol and the first time stamp may e.g. comprise bringing first data in a block into conformity with the first timestamp, or bringing first control data in a block into conformity with the first timestamp.

In an embodiment, the first-protocol specific timestamp-dependent information in a first-type frame is distributed over a plurality of blocks of the first-type frame. Then, processing a block of the plurality of blocks to replace the first-protocol specific timestamp-dependent information in the block by the first-protocol specific timestamp-dependent information formatted in dependence on at least the first communication protocol and the first time stamp, comprises replacing the first-protocol specific timestamp-dependent information in the blocks of the plurality of blocks of the first-type frame by the first-protocol specific timestamp-dependent information formatted in dependence on at least the first communication protocol and the first time stamp and distributed over the plurality of blocks of the first-type frame. For example, first-protocol specific timestamp-dependent information in the first-type frame may be in two subsequent blocks of the frame. As an illustrative and non-limiting example, a block may have a block size of 8 bytes, such that a first block comprises bytes 0-7 of the frame, a second block comprises bytes 8-15 of the frame, a third block comprises bytes 16-23 of the frame, . . . , and the first-type frame may use bytes 14-17 of the frame for timestamp information according to the first communication protocol. The timestamp information may thus be distributed over the second and the third block, and replacing the timestamp information results by distributing the timestamp information as processed accordingly, thus by replacing the timestamp information in bytes 14-15 of the frame in the second block and in bytes 16-17 of the frame.

The processor CPU1 is arranged to retrieve the second timestamp from the second timestamp register TSR2 from the time synchronization module TSM1. The processor CPU1 is further arranged to transfer a second-type frame between the second MAC buffer RFI1; TFI1 and the second local memory MEM2 in a block-wise manner. The second-type frame is hereby copied as a plurality of blocks. The processor CPU1 is arranged to process the plurality of blocks of the second-type frame using the second timestamp as retrieved from the second timestamp register. By using the second timestamp, the processor CPU1 thus processes blocks of the second-type frame in the time domain associated with the master clock. As the processor CPU1 also processes blocks of the first-type frame in the time domain associated with the master clock, blocks of the first-type frame are processed in the same time domain as blocks of the second type frame. Transferring the blocks may comprise part of the processing. For example, where a block of the plurality of blocks comprises a second-protocol specific timestamp-dependent information, the transferring comprises processing the block to replace the second-protocol specific timestamp-dependent information in the block by the second-protocol specific timestamp-dependent information formatted in dependence on at least the second communication protocol and the second time stamp. Similarly, the processor CPU1 is arranged to retrieve the third time stamp register from the third timestamp register and to use the third timestamp when processing blocks in transferring between the third MAC buffer RFP1; TFP1 and the third local memory MEM3 in a block-wise manner.

The processor CPU1 may be arranged to, after having retrieved the first timestamp from the first timestamp register and before writing the first time, format the first timestamp according to the first communication protocol.

In alternative or further embodiments, the time synchronization module TSM1 may be arranged to, in latching first timestamp into the first timestamp register, format the first timestamp according to the first communication protocol, and similarly for the other timestamps. Formatting the first timestamp, and/or one or more of the other timestamps, may comprise a time unit conversion of the respective timestamp. The time unit conversion may comprise providing the respective timestamp with a different scale and/or offset. The time unit conversion of the respective timestamp may comprise a scaling, a fractional scaling or another suitable time conversion action and/or a time offset adding. Formatting the first timestamp, and/or one or more of the other timestamps, may comprise a frequency conversion of the master clock signal by the respective time synchronization module TSM1 to obtain a scaled master clock signal. The frequency conversion may comprise providing the master clock signal with an upscaled or downscaled frequency and/or offset. Hereto, the frequency conversion of the master clock may comprise a scaling, for example a fractional scaling, or another suitable frequency conversion action, and/or adding a phase offset so as to obtain the scaled master clock signal with a frequency and/or phase derived but different from the master clock signal.

In an embodiment, the interface system may be arranged to transmit first-type frames. Hereto, the first MAC buffer may comprise a first MAC transmit buffer TFE1, the first port PRT1 may comprise a first transmit port TxE1, and the first media access controller MAC1 may be arranged to transmit first-type frames from the first MAC transmit buffer TFE1 via the first transmit port PRT1:TxE. The processor CPU1 may be herewith arranged to, in transferring the first-type frame between the first MAC transmit buffer TFE1 and the first local memory MEM1 in a block-wise manner, provide a segmentation of the first-type frame in the first local memory MEM1 into a plurality of blocks, and, for each block of the plurality of blocks: read the block from the first local memory MEM1, process the block using the first timestamp as retrieved from the first timestamp register, and write the block into the first MAC transmit buffer TFE1. Hereby, the processor CPU1 may use the first timestamp in first communication protocol specific processing before providing the blocks to the first MAC transmit buffer TFE1 for transmission. The processor CPU1 may herein use the first timestamp in first communication protocol specific processing with or without replacing any timestamp information in the block itself.

In a further embodiment, the first MAC buffer may comprise a first MAC transmit buffer TFE1, the first port PRT1 may comprise a first transmit port TxE1, and the first media access controller MAC1 may be arranged to transmit first-type frames from the first MAC transmit buffer TFE1 via the first transmit port PRT1:TxE1. The processor CPU1 may be herewith arranged to, in transferring the first-type frame between the first MAC transmit buffer TFE1 and the first local memory MEM1 in a block-wise manner and as part of processing the plurality of blocks of the first-type frame using the first timestamp as retrieved from the first timestamp register, provide a segmentation of the first-type frame in the first local memory MEM1 into a plurality of blocks, and, for each block of the plurality of blocks: read the block from the first local memory MEM1, where the block comprises a first-protocol specific timestamp-dependent information, process the block using the first timestamp as retrieved from the first timestamp register to replace the first-protocol specific timestamp-dependent information in the block by the first-protocol specific timestamp-dependent information formatted in dependence on at least the first communication protocol and the time stamp and write the block into the first MAC transmit buffer TFE1. The processor CPU1 may be arranged to check whether the first MAC transmit buffer TFE1 has space to store the block in the first MAC transmit buffer TFE1 prior to writing the block. The processor CPU1 may be arranged to check whether the first MAC transmit buffer TFE1 has space to store the plurality of blocks associated with one first-type frame in the first MAC transmit buffer TFE1 prior to writing the blocks associated with the first-type frame. The interface system may be arranged to transmit second-type frames and/or third-type frames in a similar manner. The interface system may hereby be arranged to transmit first-type, second-type and third-type frames with respective timestamp information derived from the master clock for frames according to the three associated communication protocols.

The interface system may be arranged to receive first-type frames. Hereto, the first MAC buffer comprises a first MAC receive buffer RFE1, the first port PRT1 comprises a first receive port RxE1, and the first media access controller MAC1 is arranged to receive first-type frames in the first MAC receive buffer RFE1 via the first receive port PRT1: RxE1. The processor CPU1 may herewith be arranged to, in transferring the first-type frame between the first MAC buffer RFE1 and the first local memory MEM1 in a block-wise manner, read the block from the first MAC receive buffer RFE1 and write the block into the first local memory MEM1. The block may be written into the first local memory MEM1 as the block was received in the first MAC receive buffer RFE1. The processor may be arranged to process the plurality of blocks of the first-type frame using the first timestamp as retrieved from the first timestamp register. Hereby, the processor CPU1 may use the first timestamp in first communication protocol specific processing with or without replacing any timestamp information in the block itself. The processor CPU1 may thus access the blocks of the first-type frame from the first local memory MEM1 and perform any protocol specific formatting and calculations using the first timestamp as retrieved from the first timestamp register.

In a further embodiment, the processor CPU1 is arranged to process the plurality of blocks of the first-type frame using the first timestamp as retrieved from the first timestamp register in transferring the transferring the first-type frame between the first MAC buffer RFE1 and the first local memory MEM1 in a block-wise manner. Hereto, the processor CPU1 is arranged to, where the block comprises a first-protocol specific timestamp-dependent information, process the block using the first timestamp as retrieved from the first timestamp register to replace the first-protocol specific timestamp-dependent information in the block by the first-protocol specific timestamp-dependent information formatted in dependence on at least the first communication protocol and the time stamp. The processor CPU1 may thus be arranged to use the first timestamp to replace any timestamp information in the block with first-protocol specific timestamp-dependent information formatted in dependence on at least the first communication protocol and the time stamp before providing the block to the local memory MEM1, such that blocks of received first-type frames are provided with timestamp information derived from the master clock at the start of the associated received first-type frame. Hereto, the first MAC buffer comprises a first MAC receive buffer RFE1, the first port PRT1 comprises a first receive port RxE1, and the first media access controller MAC1 is arranged to receive first-type frames in the first MAC receive buffer RFE1 via the first receive port PRT1: RxE1. The processor CPU1 may herewith be arranged to, in transferring the first-type frame between the first MAC buffer RFE1 and the first local memory MEM1 in a block-wise manner and as part of processing the plurality of blocks of the first-type frame using the first timestamp as retrieved from the first timestamp register, for each block of the plurality of blocks corresponding to the first-type frame from the first MAC receive buffer RFE1: read the block from the first MAC receive buffer RFE1, where the block comprises a first-protocol specific timestamp-dependent information, process the block using the first timestamp as retrieved from the first timestamp register to replace the first-protocol specific timestamp-dependent information in the block by the first-protocol specific timestamp-dependent information formatted in dependence on at least the first communication protocol and the time stamp, and write the block into the first local memory MEM1. Thus, where the received frame comprises an received timestamp already formatted by a transmitting entity, the processor CPU1 may retrieve the first timestamp from the first timestamp register in the time synchronization module TSM1, reformat the received timestamp in dependence on at least the first communication protocol and the first timestamp to allow further comparison or calculations by the processor CPU1.

The processor CPU1 may be arranged to check whether the first receive MAC buffer RFE1 has new data available to be read from the first MAC receive buffer RFE1 prior to reading a block from the first MAC receive buffer to prevent reading old data. The processor CPU1 may be arranged to check whether the first receive MAC buffer RFE1 has a new first-type frame available to be read from the first MAC receive buffer RFE1 prior to reading the plurality of blocks from the first MAC receive buffer to prevent a receive buffer overflow in applications where receiving data into the first MAC receive buffer via the first receipt port may be slower than transferring the data from the first MAC receive buffer to the local memory MEM1. The interface system may be arranged to receive second-type frames and/or third-type frames in a similar manner. The interface system may thus allow to synchronize time domains of multiple ports running different protocols. The block-wise processing provides a segmenting of the frame into blocks for processing, which may allow the use of a common mechanism for multiple protocols, which may allow an improved scalability of interface systems.

In an embodiment, the first media access controller MAC1 is arranged to signal the processor CPU1 that a block of a first-type frame is available in the first MAC receive buffer RFE1 for processing by the processor CPU1. The interface system may be arranged to signal the availability of blocks of second-type frames and/or third-type frames in the second MAC receive buffer and/or the third MAC receive buffer in a similar manner. In an alternative or further embodiment, the first media access controller MAC1 is arranged to signal the processor CPU1 that space is available in the first MAC transmit buffer TFE1 for writing one or more blocks of a first-type frame in the first MAC transmit buffer TFE1 by the processor CPU1 for transmission. The interface system may be arranged to that space is available for blocks of second-type frames and/or third-type frames in the third MAC receive transmit and/or the third MAC transmit buffer in a similar manner.

The time synchronization module TSM1 may be arranged to run on the master clock signal. Hereby, time domain conversion, coupling and/or management may be simplified and the time synchronization module TSM1 may give a well-defined timestamp. For multi-port interface systems, inter-port time domain conversion, coupling and/or management may be simplified. For multi-port heterogeneous interface systems, inter-port time and inter-protocol time domain conversion, coupling and/or management may be simplified. The processor CPU1 may be arranged to run on the master clock signal. Hereby, no additional high accuracy clock signal needs to be provided. The time synchronization module TSM1 and the processor CPU1 may be arranged to run on or be coupled to the master clock signal. The time synchronization module TSM1 and the processor CPU1 may be arranged to run on or be coupled to the master clock signal either directly or indirectly at the same frequency or frequencies derived from the master clock signal. The time synchronization module TSM1 and the processor CPU1 may be arranged to run on to the master clock signal or a clock signal derived from the master block signal. Hereby, the processor CPU1 and the time synchronization module TSM1 operate in a single time domain, and any other time domains may be limited to just one or more internal operation of a media access controller, such as the writing into the MAC receive buffer RFE1 via the first receive port PRT1: RxE1 at a data speed defined by a source of the data, running the respective protocol.

The processor CPU1 may be a microprocessor, such as a general purpose microprocessor a microcontroller or otherwise, and e.g. be a reduced instruction set computing (RISC) processor, or another type of programmable processor.

The first, the second and the third communication protocol may be selected from the group consisting of Ethernet, IEEE 1588, Industrial Ethernet including EtherCAT, ProfiNET and IEC 62439, PROFIBUS, CAN, HDLC, I2C, USB. One or more of the first, the second and the third communication protocol may be another protocol, such as a proprietary protocol.

Figure 2B:
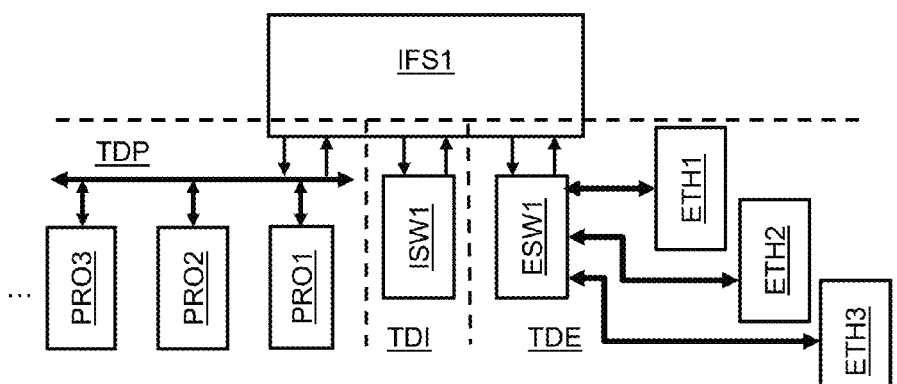
FIG. 2b schematically shows an example of an embodiment of a heterogeneous network.

FIG. 2b schematically shows an example of an embodiment of an heterogeneous network. The heterogeneous network comprises a PROFIBUS network comprising a plurality of PROFIBUS systems PRO1, PRO2, PRO3 running in a PROFIBUS Time Domain TDP, an Industrial Ethernet network ISW1 in an Industrial Time Domain TDI, and a plurality of Ethernet networks ETH1, ETH2, ETH3 connected via an Ethernet Switch ESW1 in an Ethernet Time Domain TDE. The interface system IFS1 provides an interface between the PROFIBUS network, the Industrial Ethernet network ISW1 and, via the Ethernet Switch ESW1, a plurality of Ethernet networks ETH1, ETH2, ETH3. The heterogeneous network may hereby use the interface system IFS1 according to any one of the embodiments described with reference to FIG. 2A or any interface system according to any one of the embodiments described below without modifications to any of the other systems and components of the heterogeneous network, such as the PROFIBUS systems PRO1, PRO2, PRO3, the Industrial Ethernet network ISW1, the Ethernet Switch ESW1 and the Ethernet networks ETH1, ETH2, ETH3.

Figure 3:
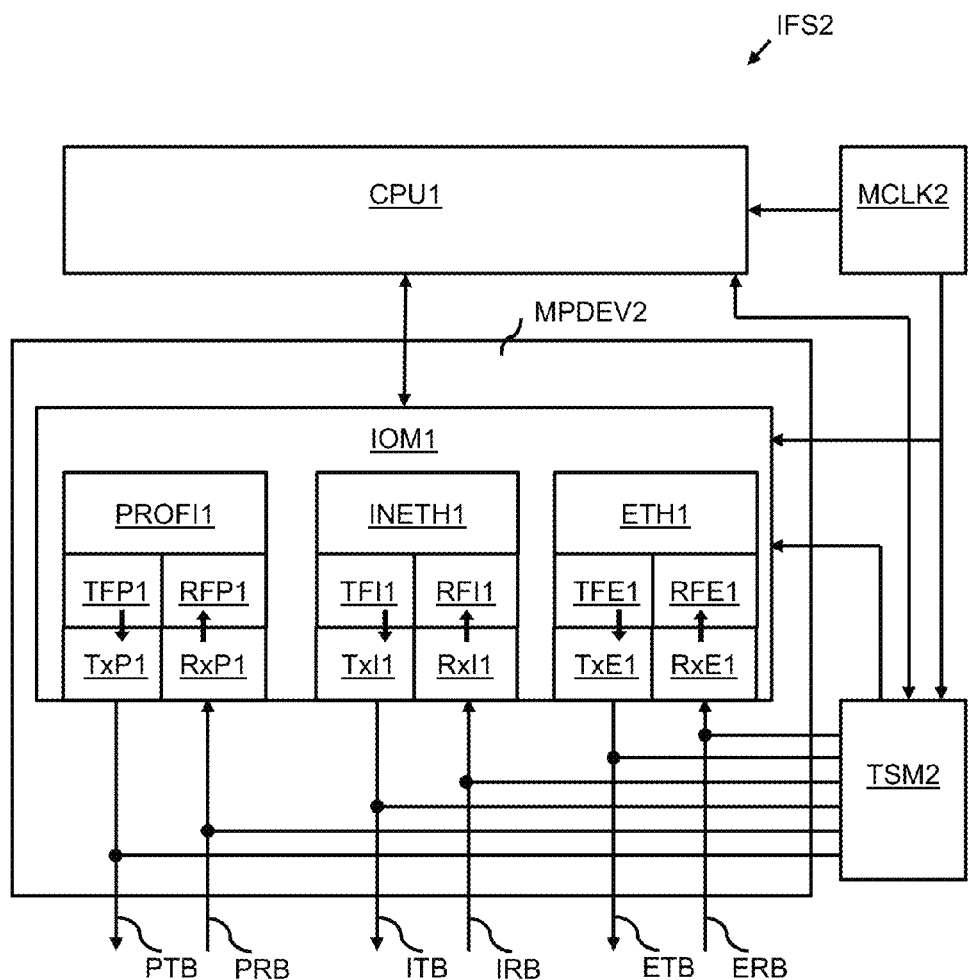
FIG. 3-FIG. 5 schematically shows other examples of embodiments of interface systems with multi-port interface devices.

FIG. 3 schematically shows an example of another embodiment of an interface system IFS2. The example shown in FIG. 3 differs from that shown in FIG. 2 in that the interface system IFS2 comprises a different embodiment of an interface device MPDEV2 than the embodiment of the interface device MPDEV1 shown in FIG. 2a. The interface device MPDEV1 of FIG. 2a comprises the I/O module IOM1 comprising the first media access controller MAC1 for interfacing to Ethernet, the second media access controller MAC2 for interfacing to Industrial Ethernet, and the third media access controller MAC3 for interfacing to PROFIBUS, as well as the time synchronization module TSM1, the master clock unit MCLK1 and the processor CPU1, whereas the interface device MPDEV2 of FIG. 2 comprises the I/O module IOM1 comprising the first media access controller MAC1 for interfacing to Ethernet, the second media access controller MAC2 for interfacing to Industrial Ethernet, and the third media access controller MAC3 for interfacing to PROFIBUS, but has the time synchronization module TSM2, the master clock unit MCLK2 and the processor CPU1 as external components. The connections and the functionality of all these components in FIG. 3 is substantially the same as in FIG. 2.

Thus, the example shown in FIG. 3 provides an interface system IFS2 comprising a interface device MPDEV2. The interface device MPDEV2 comprises the first media access controller MAC1. The interface device MPDEV2 is arranged to cooperate with the time synchronization module TSM2. The interface device MPDEV2 is arranged to cooperate with the master clock unit MCLK2. The interface device MPDEV2 is arranged to cooperate with the processor CPU1. The master clock unit MCLK2 is external to the interface device MPDEV2.

Figure 4:
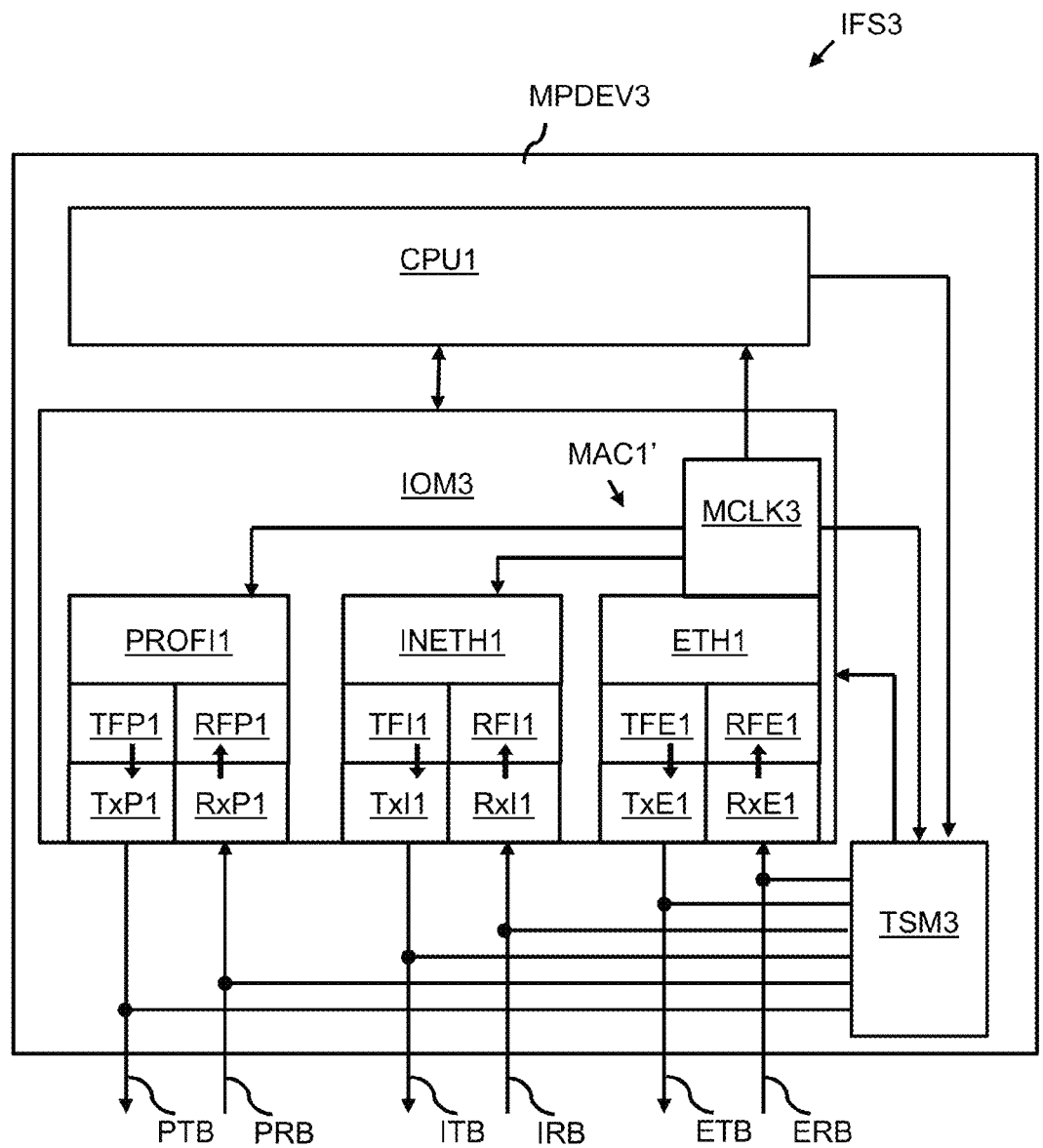

FIG. 4 schematically shows an example of another embodiment of an interface system IFS3. The example shown in FIG. 4 differs from that shown in FIG. 2 in that the interface system IFS3 comprises a different embodiment of an interface device MPDEV3 than the embodiment of the interface device MPDEV2 shown in FIG. 2: In the interface device MPDEV1 of FIG. 2, the master clock unit MCLK1 is provided as an individual unit within interface device MPDEV1, whereas the master clock unit of interface device MPDEV3 of FIG. 4 is provided by a Ethernet MAC clock unit MCLK3 of Ethernet MAC MAC1'. To make the clock signal provided by the Ethernet MAC clock unit MCLK3 available as master clock for the complete interface device MPDEV3, the I/O module IOM3 of FIG. 4 also has a clock signal connection connected to the processor CPU1 and another clock signal connection connected to the time synchronization module TSM3. The further connections and the functionality of all these components in FIG. 4 is substantially the same as in FIG. 2. Thus, in this example, the time synchronization module TSM3 is arranged to run on the master clock signal. Also, in this example, the processor CPU1 is arranged run on the master clock signal. In alternative embodiments, the time synchronization module TSM1 and/or the processor CPU1 may be arranged to run on a clock signal derived from the master clock signal, e.g., a down-scaled or up-scaled version of the master clock signal.

Figure 5:
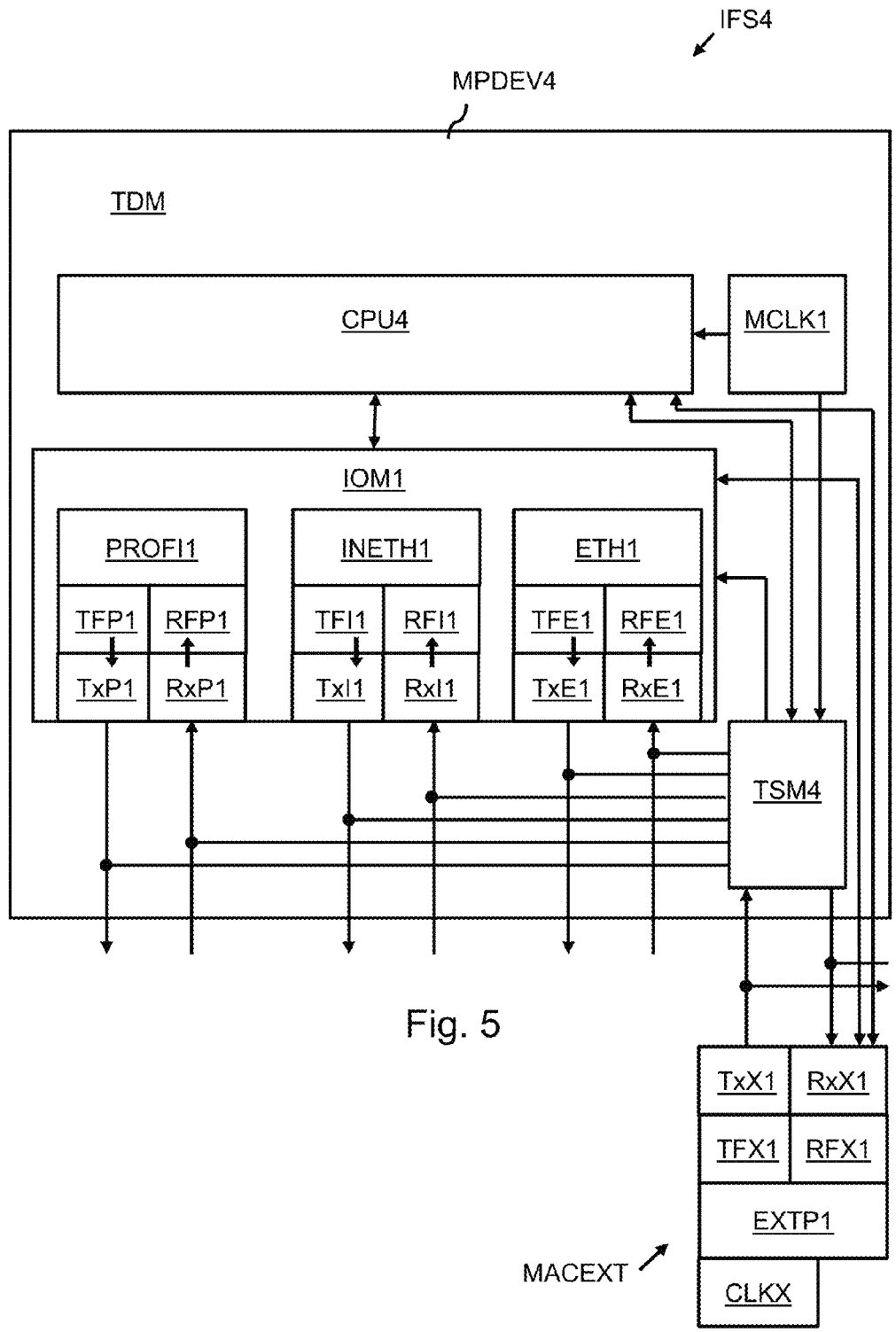

FIG. 5 schematically shows an example of another embodiment of an interface system IFS4. The example shown in FIG. 5 differs from that shown in FIG. 2 in that the interface system IFS3 comprises a different embodiment of an interface device MPDEV4 than the embodiment of the interface device MPDEV2 shown in FIG. 2, and an external media access controller MACEXT for providing a further communication interface over a further port TxX1, RxX1 using further-type frames according to a further communication protocol. The further port TxX1, RxX1 has a further receive port RxX1 and a further transmit port TxX1. The further communication protocol may be one of the protocols used by the MACs in the interface device MPDEV2 or again another protocol such as e.g. PCI. The external media access controller MACEXT has a further MAC receive buffer RFX1 for storing at least one further-type frame as received in a further frame format according to the further communication protocol and a further MAC transmit buffer TFX1 for storing at least one further-type frame for transmission in a further frame format according to the further communication protocol. The further MAC receive buffer RFX1 and the second MAC transmit buffer TFX1 are implemented as FIFOs. The external media access controller MACEXT is connected in a similar manner to the time synchronization module TSM4 and the processor CPU4 of the interface device MPDEV4 as the Ethernet media access controller, the Industrial Ethernet media access controller and the PROFIBUS media access controller in the interface device MPDEV4, and the timestamp information of further-type frames in the further MAC transmit buffer and the further MAC receive buffer RFX1 is handled in a similar manner as the timestamp information of first-type, second-type and third-type frame, in that the time synchronization module TSM4 and the processor CPU4 cooperate to provide the timestamp from the master clock in a protocol-specific format, transfer the further-type frame to and from the further MAC transmit buffer and the further MAC receive buffer RFX1 in a block-wise manner, where the processor CPU4 is arranged to process the plurality of blocks of the further-type frame using the timestamp information of further-type frames as determined from the master clock. The processor CPU4 may be arranged to, in transferring the blocks and as part of processing the blocks of further-type frames, where a block comprises a further-protocol specific timestamp-dependent, process the block using the timestamp as determined from the master clock to replace the further-protocol specific timestamp-dependent information in the block by the further-protocol specific timestamp-dependent information formatted in dependence on the further communication protocol and the time stamp determined from the master clock. The external media access controller MACEXT may have a clock interface to be connected to the master clock unit MCLK1 and run on the master clock signal or a clock signal derived therefrom. The external media access controller MACEXT may comprise an internal clock unit CLKX and run on a clock signal provided by the internal clock unit for its internal operations. In an embodiment, the external media access controller MACEXT may comprise an internal clock unit CLK, allowing the external media access controller MACEXT to run on the clock signal provided by the internal clock unit for its internal operations when no other clock unit is connected to the external media access controller MACEXT, and have a clock interface allowing to connect the external media access controller MACEXT to the master clock unit MCLK1, with the external media access controller MACEXT being arranged to run on the master clock signal or a clock signal derived therefrom when the master clock unit MCLK1 is connected to the external media access controller MACEXT.

Figures 6A, 6B:
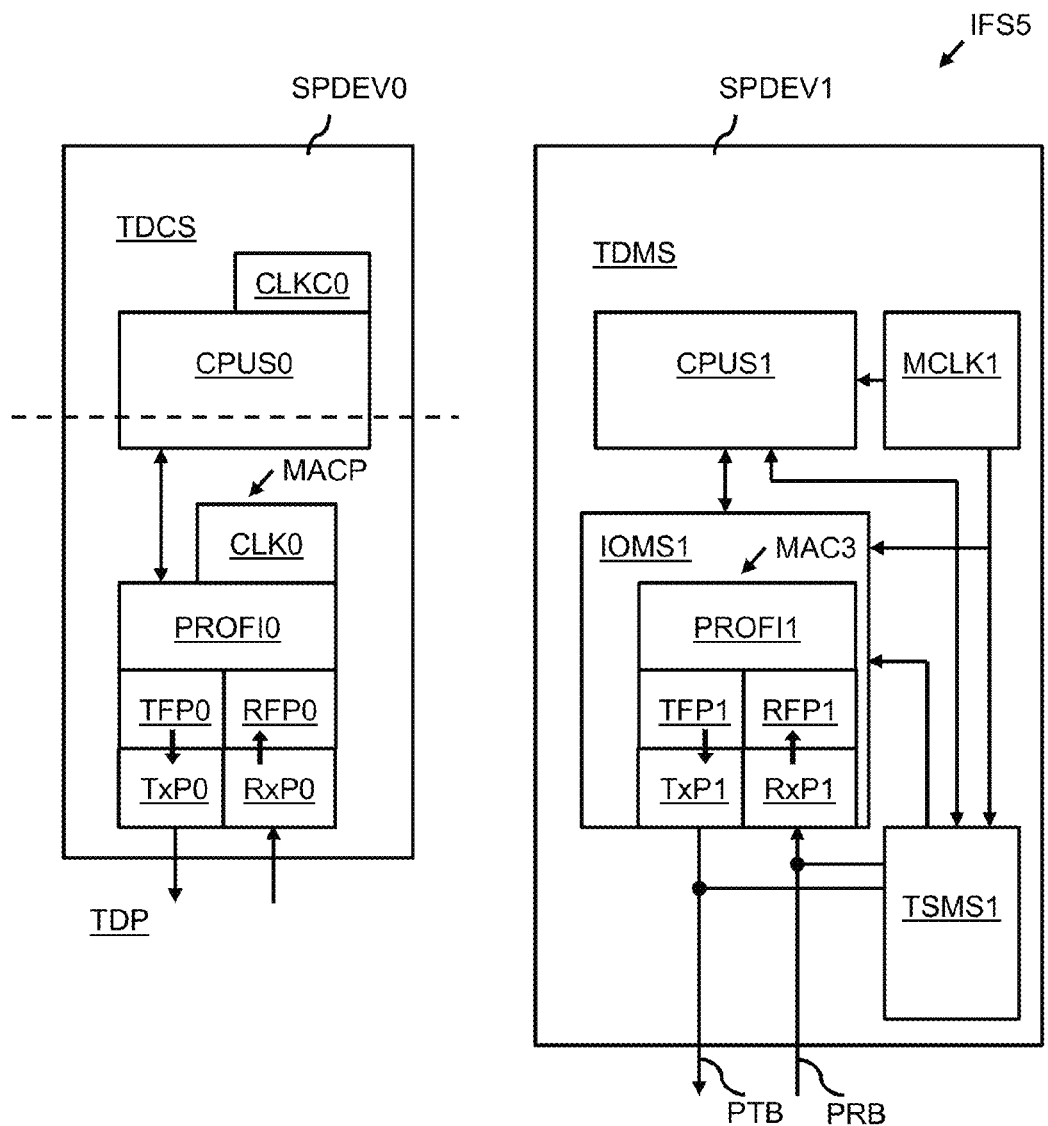
FIG. 6a schematically shows an example of a prior art single-port interface device.
FIG. 6b schematically shows an example of an embodiment of a single-port interface device.

FIG. 6a schematically shows an example of a prior art single-port interface device SPDEV0. The prior art single-port interface device SPDEV0 differs from the prior art multi-port interface device MPDEV0 shown in FIG. 1a in that the single-port interface device SPDEV0 comprises an interface for a single protocol only. In the example shown, the single protocol is a PROFIBUS protocol, and the associated PROFIBUS media access controller MACP shown in FIG. 6a may correspond to the PROFIBUS media access controller MACP shown in FIG. 1a. In alternative embodiments, a single-port interface device SPDEV0 may comprise an interface for another protocol, e.g., provide an interface for another one of the group consisting of Ethernet, IEEE 1588, Industrial Ethernet including EtherCAT and IEC 62439, PROFIBUS, CAN, HDLC, I2C, USB. Also for such a single-port interface device SPDEV0, coupling of the time domain across the interface may be complex and prior art systems use dedicated hardware externally or embedded within the port, and/or complex software to control and synchronize.

FIG. 6b schematically shows an example of an embodiment of a single-port interface device SPDEV1. The example shown in FIG. 6a differs from the multi-port device MPDEV1 shown in FIG. 2a in that only a single interface is provided to another time domain, here, the PROFIBUS Time Domain TDP. I/O module IOSM1 hereto comprises a PROFIBUS media access controller MAC3 for interfacing to PROFIBUS corresponding to the third media access controller MAC3 of FIG. 2a. Processor CPUS1, master clock unit MCLK1 and time synchronization module TSMS1 are arranged to operate in a similar manner as corresponding components described with reference to FIG. 2. Thus, the time synchronization module TSMS1 is arranged to detect a start of a PROFIBUS-type frame provided to the PROFIBUS media access controller (MAC3), and, upon detecting the start of the PROFIBUS-type frame, determine a PROFIBUS timestamp from a master clock signal provided from a master clock unit MCLK1, latch the PROFIBUS timestamp into a PROFIBUS timestamp register in the time synchronization module TSMS1 and keep the PROFIBUS timestamp in the PROFIBUS timestamp register at least until the start of the next frame PROFIBUS-type frame. Further, the processor CPUS1 is arranged to retrieve the PROFIBUS timestamp from the PROFIBUS timestamp register from time synchronization module TSMS1 and to transfer a PROFIBUS-type frame between the PROFIBUS MAC buffer RFP1; TFP1 and a local memory of the processor in a block-wise manner, the PROFIBUS-type frame being hereby copied as a plurality of blocks, and to process the plurality of blocks of the PROFIBUS-type frame using the PROFIBUS timestamp as retrieved from the PROFIBUS timestamp register. The transferring may comprise, where a block of the plurality of blocks comprises PROFIBUS-protocol specific timestamp-dependent information, process the block to replace the PROFIBUS-protocol specific timestamp-dependent information in the block by the PROFIBUS-protocol specific timestamp-dependent information formatted in dependence on the PROFIBUS communication protocol and the PROFIBUS time stamp.

Figure 7:
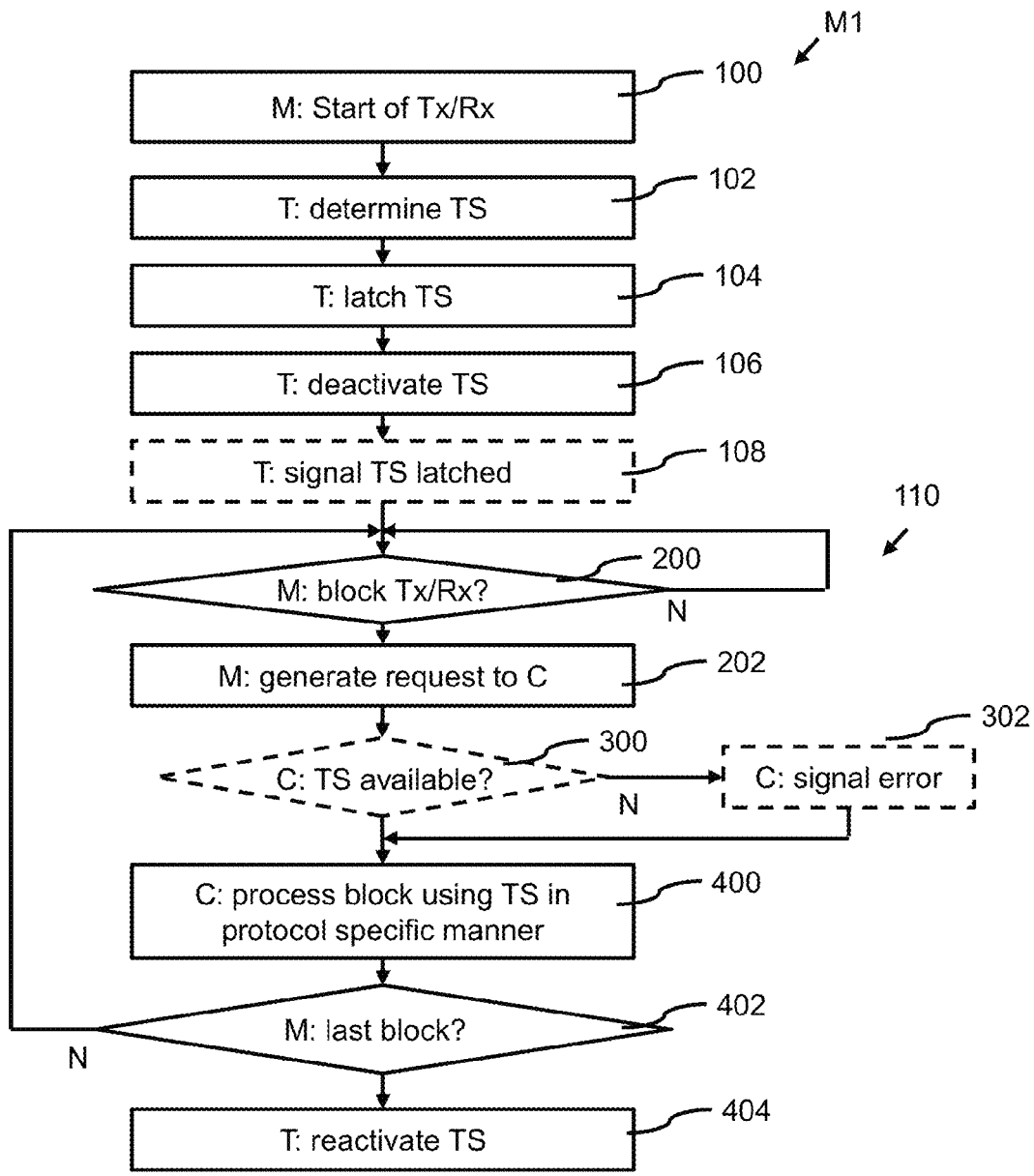
FIG. 7 schematically shows an example of an embodiment of an interfacing method.

Hereby, the PROFIBUS media access controller MAC3 may be simplified compared to the prior art PROFIBUS media access controller MACP as the PROFIBUS media access controller MAC3 of FIG. 6b lacks the complex protocol-specific timestamp hardware that the prior art PROFIBUS media access controller MACP. Further, as the controller CPUS1 processes the blocks of a PROFIBUS frame while the timestamp of the PROFIBUS frame itself is being available to the controller CPUS1, the single-port interface device SPDEV1 may use a so-called one-step in transmitting the PROFIBUS frame and the timestamp, whereas prior art systems may need a so-called two-step transmission, wherein the timestamp associated with a frame can only be send with the next frame and/or prior art systems need further protocol specific hardware to accommodate for a one-step transmission FIG. 7 schematically shows an example of an embodiment of an interfacing method M1 for providing communication via a first communication interface over a first port of a first media access controller using first-type frames according to a first communication protocol, the first media access controller having a first MAC buffer for storing at least one first-type frame in a first frame format according to the first communication protocol. The method comprises detecting 100 a start of a first-type frame provided to the first media access controller. The detecting 100 may directly be performed by a time synchronization module, or may comprise a first detection by the first media access controller followed by a detection by the time synchronization module of the first detection. The detecting 100 may use first physical bus signals on a first physical layer bus connecting the first MAC buffer to the first port and arranged to transfer data between the first MAC buffer to the first port. The method comprises, upon detecting the start of the first-type frame, determining 102 a first timestamp from a master clock signal provided from a master clock unit. The determining 102 may be performed by the time synchronization module. The method further comprises latching 104 the first timestamp into a first timestamp register and keeping 106 the first timestamp in the first timestamp register at least until a start of a next first-type frame is detected. Hereby, the first timestamp may be kept available in the first timestamp register for retrieval by the processor while processing the blocks of the first-type frame. The latching 104 may be performed by the time synchronization module. The first timestamp register may be provided in the time synchronization module. Keeping 106 the first timestamp in the first timestamp register may be referred to as deactivating the first timestamp. The method may comprise signalling 108 that the first timestamp is latched to the processor.

The method further comprises transferring 110 a first-type frame between the first MAC buffer and a first local memory in a block-wise manner. The first-type frame is hereby copied as a plurality of blocks. For receiving a first-type frame, transferring the first-type frame between the first MAC buffer and the first local memory may comprise reading from the first MAC buffer and writing into the first local memory. For transmitting a first-type frame, transferring the first-type frame between the first MAC buffer and the first local memory may comprise reading from the first local memory and writing into the first MAC buffer.

In the embodiment shown, the transferring 110 comprises, where a block of the plurality of blocks comprises a first-protocol specific timestamp-dependent information, process the block to replace the first-protocol specific timestamp-dependent information in the block by the first-protocol specific timestamp-dependent information formatted in dependence on at least the first communication protocol and the time stamp.

Hereto, the transferring 110 comprises checking 200 by the first media access controller whether a transfer from or to the first MAC buffer for transmission or receipt can be executed. For transmission, the checking 200 may comprises checking whether there is sufficient free space in the first MAC buffer for writing a block of the first-type frame to be transmitted in the first (transmit) MAC buffer. For receipt, the checking 200 may comprises checking whether there is new data in the first (receipt) MAC buffer for reading a block of the first-type frame for further processing by the processor from the first MAC buffer. The transferring 110 further comprises, indicating 202 by the first media access controller to a processor that a transfer from or to the first MAC buffer for transmission or receipt can be executed.

The method may further comprise, by the processor, retrieving the first timestamp from the first timestamp register. In an embodiment, the processor may copy the first timestamp as retrieved from the first timestamp register in the time synchronization module into a local first timestamp register of the processor. In an embodiment, the processor may copy the first timestamp as retrieved from the first timestamp register in the time synchronization module into a memory in the processor or in a memory external to and accessible by the processor.

The method may further comprises, by the processor, checking 300 whether a first timestamp is available at the processor. In an embodiment, checking 300 whether a first timestamp is available at the processor may be performed for a subset of blocks, the subset of blocks corresponding to those blocks in a first-type frame that are defined, according to the first protocol, to have first-protocol specific timestamp-dependent information. In another embodiments checking 300 whether a first timestamp is available at the processor may be performed for one block per frame, the one block corresponding to the first block of the plurality of blocks associated with a first-type frame that is defined, according to the first protocol, to have first-protocol specific timestamp-dependent information. The method may further comprises, by the processor, signalling 302 an error when no first timestamp is available at the processor for the block that requires protocol dependent timestamp insertion, and to react in an appropriate manner. Reacting in an appropriate manner may comprise continuing to an error state and signalling the error state to an external device, e.g., a host device. Reacting in an appropriate manner may comprise continuing the flow of FIG. 7 to block 400 with a replacement first timestamp, the replacement first timestamp being defined according to a predefined error state. The replacement first timestamp may e.g. be defined to be the previous first timestamp increased by a timestamp difference between the previous first timestamp and its subsequent first timestamp.

The method comprises processing 400 the block using the first timestamp in a first-protocol specific manner. The processing may, in whole or in part, be part of the transferring 110. The transferring 110, may e.g. further comprise, by the controller, processing 400 the block using the first timestamp in a first-protocol specific manner. For transmission, processing 400 the block comprises copying the block from the local memory of the processor into the first MAC buffer, and may comprise, where the block comprises a first-protocol specific timestamp-dependent information, replacing the first-protocol specific timestamp-dependent information in the block by the first-protocol specific timestamp-dependent information formatted in dependence on at least the first communication protocol and the first timestamp. For receipt, processing 400 the block may comprises copying the block from the first MAC buffer into the local memory of the processor, and the processing 400 may comprise, where the block comprises a first-protocol specific timestamp-dependent information, replacing the first-protocol specific timestamp-dependent information in the block by the first-protocol specific timestamp-dependent information formatted in dependence on at least the first communication protocol and the first timestamp. For receipt, processing 400 the block using the first timestamp in a first-protocol specific manner may comprises copying the block from the first MAC buffer into the local memory of the processor, and, where the block comprises a first-protocol specific timestamp-dependent information, perform a further processing of the block or of the first-type frame comprising the block using the first-protocol specific timestamp-dependent information. For example, processing 400 the block using the first timestamp in a first-protocol specific manner may be associated with performing a control action in dependence on the first-protocol specific timestamp-dependent information in the block.

The transferring 110 comprises checking 402 by the first media access controller whether a further block associated with the first-type frame is available for transfer, or whether all blocks of the frame have been transferred. If a further block associated with the first-type frame is available for transfer, the method continues with transferring 110 the further block. If all blocks of the frame have been transferred and no further retrieval of the first timestamp by the processor is to be performed, the first timestamp register is released 404 for writing a next first timestamp into the first timestamp register. Releasing the first timestamp register may also be referred to as reactivating the first time stamp.

Figure 8:
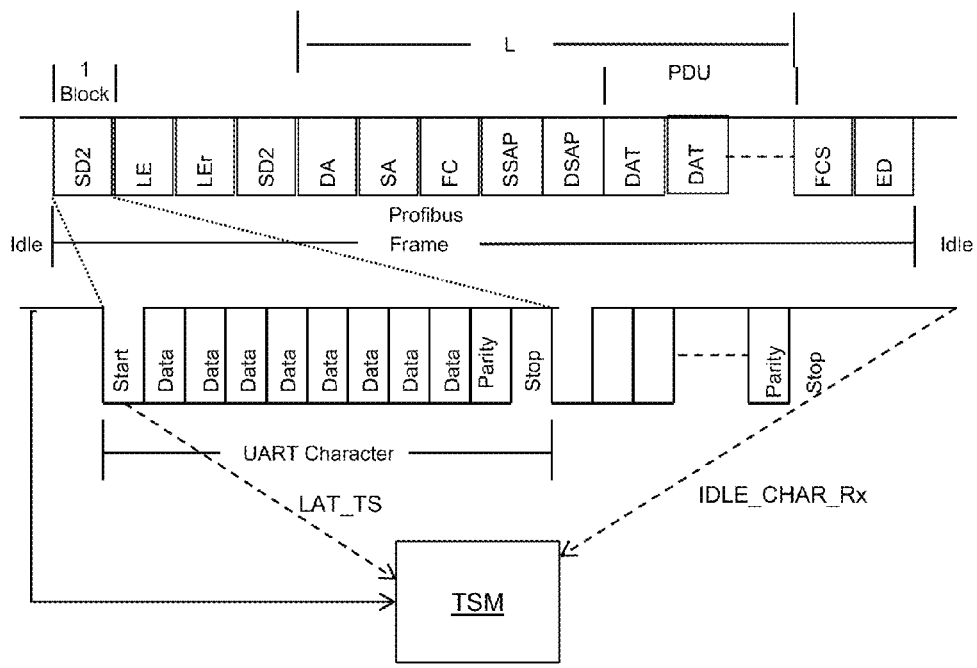
FIG. 8-FIG. 9 schematically show details of different protocols for interfacing according to embodiments.

FIG. 8 schematically show details of handling a PROFIBUS frame for interfacing according to an embodiment. PROFIBUS (Process Field Bus) is a standard for fieldbus communication in automation technology. FIG. 8 shows a PROFIBUS frame according to a PROFIBUS protocol for variable length data, also known as a PROFIBUS telegram. The PROFIBUS frame comprises a sequence of fields for comprising the following information:

SD2: Start Delimiter (value 0x68 for indicating variable length data)
LE: Length of protocol data unit (incl. DA, SA, FC, DSAP, SSAP) (value between 4 and 249)
LEr: Repetition of length of protocol data unit,
DA: Destination Address
SA: Source Address
DSAP: Destination Service Access Point
SSAP: Source Service Access Point
FC: Function Code or Frame Control
PDU: Protocol Data Unit of a variable length of max. 246 DAT octets
FCS: Frame Check Sum
ED: End Delimiter (value 0x16)
L: Information length (variable number of octets: value between 4 and 249)

The FCS is a summation of the bytes within the specified length truncated to one byte. The frame is preceded and followed by Idle periods.

Each byte of the PROFIBUS frame is encapsulated within an UART character with an even Parity bit and transferred asynchronously with a Start and Stop bit. According to the PROFIBUS protocol, there must not be a pause between a stop bit and the following start bit when the bytes of a PROFIBUS frame are transmitted PROFIBUS frame are separated with a SYN pause of at least 33 bits (logical "1"=bus idle).

For PROFIBUS frames, the associated timestamp may be activated in the time synchronization module TSM while the bus is idle, and the time synchronization module TSM latches the timestamp into the timestamp register associated with the PROFIBUS interface and deactivates the timestamp upon detecting a Start bit, as indicated with LAT_TS. The timestamp is kept in the timestamp register associated with the PROFIBUS interface until the complete frame is received and the bus has turned to idle again, which may be detected from a receipt of an Idle character (the SYN pause of at least 33 buts of logical "1") as indicated with IDLE_CHAR_Rx. The time synchronization module TSM then reactivates the timestamp to let it reflect the time according to a master clock signal (not shown) upon transmission of the subsequent frame. The time synchronization module TSM is thus arranged to detect a start of a PROFIBUS frame, and to, upon detecting the start of the PROFIBUS frame, determine a PROFIBUS timestamp from a master clock signal, latch the first timestamp into a PROFIBUS timestamp register in the time synchronization module TSM and keep the PROFIBUS timestamp in the PROFIBUS timestamp register at least until a start of a next PROFIBUS frame is detected.

As indicated, the PROFIBUS frame may be segmented by the controller into a plurality of blocks of a length of, for example, one byte encapsulated within one UART character for transferring between the associated MAC buffer and the associated local memory.

Figure 9:
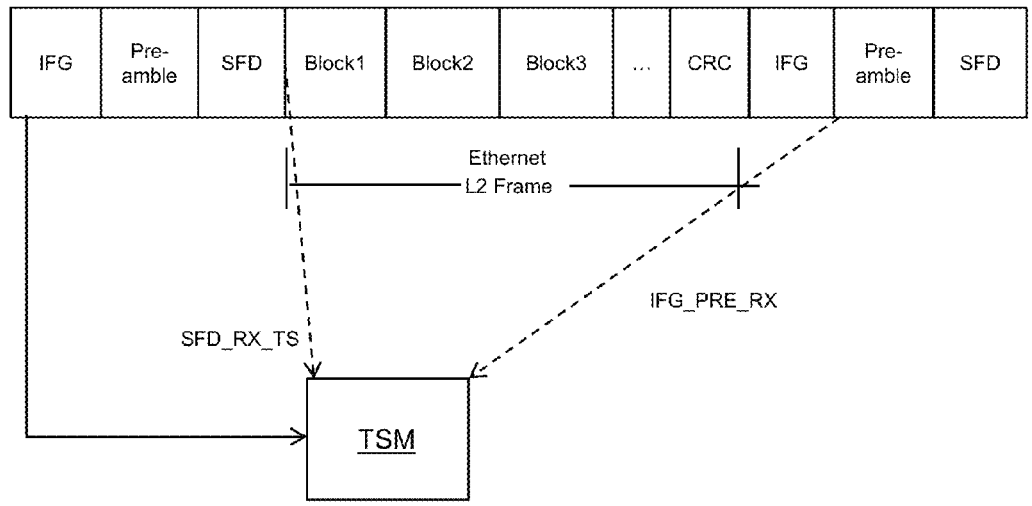

FIG. 9 schematically show details of handling an Ethernet frame for interfacing according to an embodiment. Ethernet is used to communicate a stream of data via Ethernet frames. Each Ethernet frame contains source and destination addresses and error-checking data so that corrupted data can be detected and may be re-transmitted. In the OSI model, Ethernet provides services up to and including the data link layer. FIG. 9 shows an Ethernet frame according to a Ethernet protocol for variable length data. The Ethernet frame structure comprises:

IFG: an Inter-frame Gap of 12 bytes,
Preamble: a Preamble, 7 bytes of value 0x55
SFD: Start Frame Delimiter, 1 byte of value 0xD5
Ethernet L2 frame: Ethernet layer 2 frame comprising a MAC destination address of 6 bytes, a MAC source address of 6 bytes, an optional tag of 4 bytes, an Ethernet type of 2 bytes and a payload between 42 (where the tag is present) or 46 (of no tag is present) and 1500 bytes, and a 32-bit CRC.

For Ethernet frames, the associated timestamp may be activate in the time synchronization module TSM while the bus is idle and while the preamble is on the bus. The time synchronization module TSM may latch the timestamp into the timestamp register associated with the Ethernet interface and deactivate the timestamp upon detecting a Start Frame Delimiter, as indicated with SFD_RX_TS. The timestamp is kept in the timestamp register associated with the Ethernet interface until the complete frame is received and the bus has turned to idle again, which may be detected from detecting the Inter-Frame Gap following the Ethernet frame or from detecting a next Preamble, as indicated with IFG_PRE_RX. The time synchronization module TSM then reactivates the timestamp to let it reflect the time according to a master clock signal (not shown) upon transmission of the subsequent frame. The time synchronization module TSM is thus arranged to detect a start of a Ethernet frame, and to, upon detecting the start of the Ethernet frame, determine a Ethernet timestamp from a master clock signal, latch the first timestamp into a Ethernet timestamp register in the time synchronization module TSM and keep the Ethernet timestamp in the Ethernet timestamp register at least until a start of a next Ethernet frame is detected.

As indicated, the Ethernet frame may be segmented by the controller into a plurality of blocks Block1, Block2, Block 3, . . . for transferring between the associated MAC buffer and the associated local memory. The blocks may have a length of, for example, 8, 16, 32, 64 or 128 bytes. In alternative embodiments, the blocks may e.g. have a length different from a power of two.

Figure 10A:
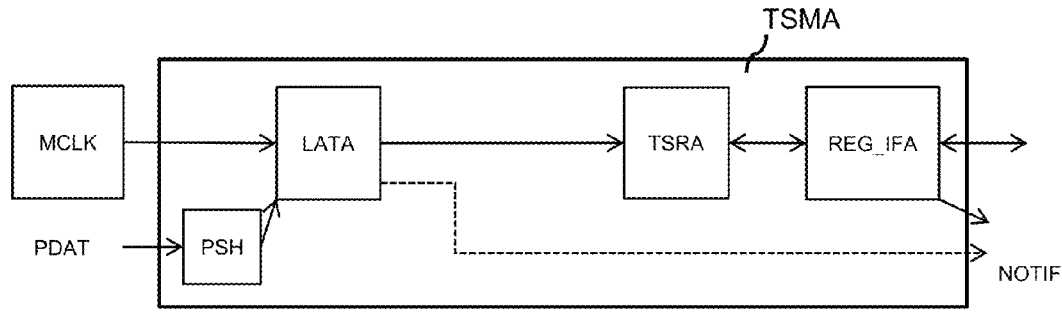
FIG. 10a-FIG. 10c schematically show examples of embodiments of a time synchronization module.
Figure 10B:
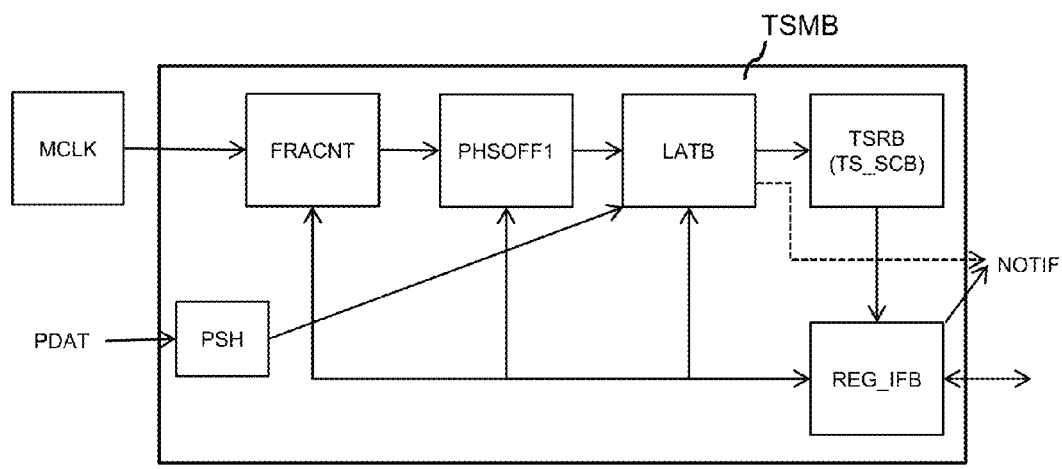
Figure 10C:
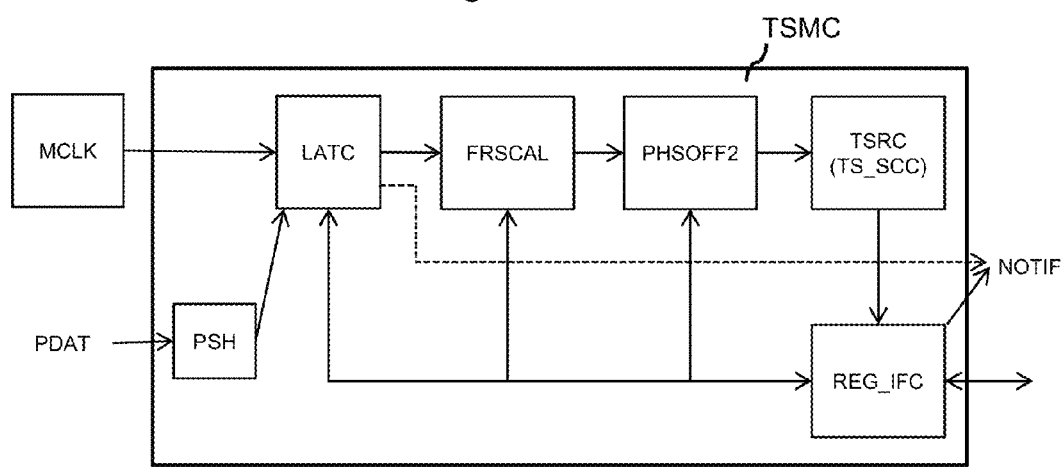

FIG. 10a-FIG. 10c schematically show examples of embodiments of a time synchronization module. The Figures only show a timestamp processing channel within the time synchronization module for a first communication protocol and for one direction of communication (transmit or receipt). It will be understood that the timestamp processing channel may be duplicated for supporting timestamp processing for transmit and receipt. It will be understood that the timestamp processing channel may be duplicated for other protocols in further embodiments of a time synchronization module for multi-protocol interfaces, or for the same protocol for multi-port single-protocol interfaces. It will be understood that timestamp processing channels according to different examples may be used within further embodiments of a time synchronization module. The time synchronization module is arranged to detect a start of a first-type frame provided to the first media access controller and to, upon detecting the start of the first-type frame, determine a first timestamp from a master clock signal provided from a master clock unit, latch the first timestamp into a first timestamp register in the time synchronization module and keep the first timestamp in the first timestamp register at least until a start of a next first-type frame is detected.

FIG. 10a schematically shows an example of a first embodiment of a time synchronization module TSMA. The time synchronization module TSMA is arranged to be connected to a master clock unit MCLK to receive a master clock signal having master clock ticks. The time synchronization module TSMA comprises a protocol-specific hardware unit PSH for receiving first-type frame data PDAT and arranged to detect a start of a first-type frame, for example according to one of the methods described with reference to FIG. 8 and FIG. 9. The time synchronization module TSMA comprises a latch LATA connected to the master clock unit MCLK, to the protocol-specific hardware unit PSH and to a first timestamp register TSRA. The time synchronization module TSMA comprises a register interface REG_IFA. The protocol-specific hardware unit PSH is arranged to, upon detecting the start of the first-type frame, signal the latch LATA accordingly. The latch LATA is arranged to latch a first timestamp determined from the master clock signal into the first timestamp register TSRA in the register interface REG_IFA upon receiving the signal from the protocol-specific hardware unit PSH that a start of the first-type frame is detected. The latch LATA may hereto e.g. be arranged to latch a first counter which increments using the master clock signal to obtain the first timestamp. The latch LATA may be arranged to increment the first counter in a first counter register using the master clock signal and to latch the first counter from the timestamp. The latch LATA may be arranged to increment the first counter in a first into the first timestamp register TSRA upon detection of the start of the first-type frame. The protocol-specific hardware unit PSH is further arranged to, upon detecting an end of the first-type frame or upon detecting an idle period after the first-type frame, signal the latch LATA that the timestamp may be reactivated. The latch LATA is arranged to continue to receive the master clock signal until upon receiving the signal from the protocol-specific hardware unit PSH that the timestamp may be reactivated, such that, when the latch LATA receives a next signal from the protocol-specific hardware unit PSH that a start of a next first-type frame is detected, a next timestamp may be latched into the first timestamp register TSRA. Hereby, the first timestamp is kept in the first timestamp register TSRA at least until a start of a next first-type frame is detected. The register interface REG_IFA is arranged to provide access to the first timestamp stored in the first timestamp register TSRA. The register interface REG_IFA may hereto be arranged to provide a direct memory access by the controller to the first timestamp register TSRA for letting the controller retrieve the first timestamp from the first timestamp register TSRA. The register interface REG_IFA may alternatively be arranged to read the first timestamp from the first timestamp register TSRA upon a request by the controller and to provide the first timestamp to the controller. In further embodiments, the latch LATA may be arranged to provide a notification signal NOTIF, e.g. to the processor, to indicate that a new first timestamp is latched in the first timestamp register TSRA and available for retrieval therefrom.

FIG. 10b schematically shows an example of a second embodiment of a time synchronization module TSMB. The time synchronization module TSMB shown in FIG. 10b differs from the time synchronization module TSMA shown in FIG. 10a in that time synchronization module TSMB is arranged, in latching the master clock signal into the first timestamp register TSRB, to process the master clock signal to provide a timestamp at a different scale and offset than as received directly from the master clock unit MCLK. Hereto, the time synchronization module TSMB comprises a fractional adder based counter FRACNT, a phase offset adder PHSOFF1, a latch LATB and a timestamp register TSRB for storing the first timestamp in a format according to the first communication protocol. The fractional adder based counter FRACNT is arranged to receive the master clock signal and to downsample—or in alternative embodiments, upsample—the master clock to obtain a scaled master clock at a time resolution according to the first communication protocol. The phase offset adder PHSOFF1 is arranged to provide the scaled master clock with a phase offset according to the first communication protocol to obtain the processed master clock in the format according to the first communication protocol. The phase offset adder PHSOFF1 is further arranged to provide the processed master clock to the latch LATB. The latch LATB is arranged to latch a timestamp determined from the processed master clock into the timestamp register TSRB upon receiving the signal from the protocol-specific hardware unit PSH that a start of the first-type frame is detected to hereby store obtain the first timestamp in the format according to the first communication protocol. For determining the timestamp from the processed master clock, the latch LATB may e.g. be arranged to latch a counter which increments using the processed master clock signal to obtain the timestamp. The first timestamp in the format according to the first communication protocol may be referred to as a formatted first timestamp TS_SCB. The time synchronization module TSMB further comprises a register interface REG_IFB arranged to provide access to the formatted first timestamp stored in the timestamp register TSRB. The fractional adder based counter FRACNT, the phase offset adder PHSOFF1 and/or the latch LATB may be configurable with one or more suitable configuration values, such as one or more counter configuration values, a phase offset configuration value and/or other configuration value(s), via the register interface REG_IFB and/or in another suitable manner.

FIG. 10c schematically shows an example of a third embodiment of a time synchronization module TSMC. The time synchronization module TSMC shown in FIG. 10c differs from the time synchronization module TSMB shown in FIG. 10b in that time synchronization module TSMC is arranged to process the master clock signal to provide a timestamp at a different scale and offset than as received directly from the master clock unit MCLK in a different manner than the time synchronization module TSMB. Hereto, the time synchronization module TSMC comprises a latch LATC, a fractional scaler FRSCALT, a phase offset adder PHSOFF2, and a timestamp register TSRC for storing the first timestamp in a format according to the first communication protocol. Whereas the time synchronization module TSMB shown in FIG. 10b processes the first timestamp into a formatted first timestamp while the timestamp is activated, the time synchronization module TSMC shown in FIG. 10c is arranged to process the first timestamp into a formatted first timestamp after the first timestamp is latched, or while the timestamp is deactivated. The latch LATC is arranged to latch the first timestamp upon receiving the signal from the protocol-specific hardware unit PSH that a start of the first-type frame is detected and to provide the first timestamp as latched to the fractional scaler FRSCALT. The fractional scaler FRSCALT is arranged to receive scaled the first timestamp as thus latched to it by the latch LATC to obtain a scaled timestamp at a time resolution according to the first communication protocol. The phase offset adder PHSOFF2 is arranged to provide the scaled timestamp with an offset according to the first communication protocol to obtain the first timestamp in the format according to the first communication protocol. The first timestamp in the format according to the first communication protocol may be referred to as a formatted first timestamp TS_SCC. The phase offset adder PHSOFF2 is further arranged to write the formatted first timestamp into the timestamp register TSRC. The time synchronization module TSMC further comprises a register interface REG_IFC arranged to provide access to the formatted first timestamp stored in the timestamp register TSRC. The time synchronization module TSMC is hereby arranged to, in latching the first timestamp into the first timestamp register, format the first timestamp according to the first communication protocol. The latch LATC, the fractional scaler FRSCALT and/or the phase offset adder PHSOFF2 may be configurable with one or more suitable configuration values, such as a fractional scaling configuration value, an offset configuration value, and/or other configuration value(s), via the register interface REG_IFC and/or in another suitable manner.

Figure 11:
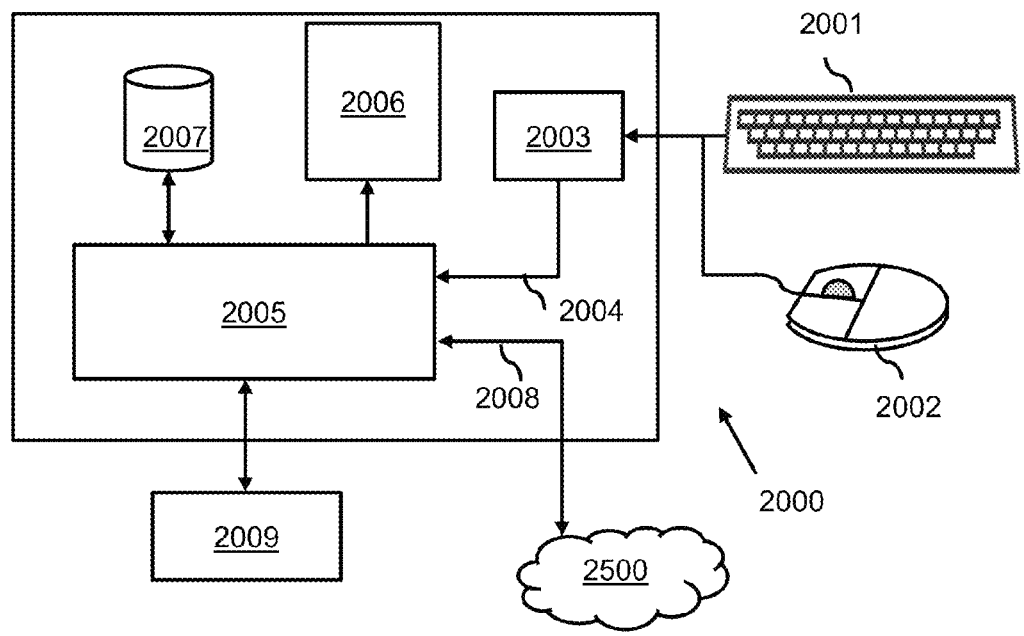
FIG. 11 schematically shows an exemplary user interaction system.

FIG. 11 schematically shows an exemplary user interaction system 2000 having a programmable processor 2005. The user interaction system 2000 is shown to be a personal computer, but may be any type of suitable user interaction system 2000. The programmable processor may comprise one or more components of system IFS1, IFS2, IFS3 or IFS4. The user interaction system 2000 further comprises a storage unit 2007, a user input 2003 and a display 2006, which may be the same as display 521 in FIG. 2 or an additional display. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention to receive user data and user instructions 2004 according to e.g. a USB protocol, to provide image data using e.g. a AGP protocol to the display 2006 to present visual information on the display 2006 and to communicate, e.g. using a PCI protocol, with a data I/O device 2009, such as an optical disc drive or a solid state reader/writer. The processor 2005 is arranged to cooperate with the storage unit 2007, allowing storing and retrieving information on the storage unit 2007. The user interaction system 2000 may further comprise a communication channel 2008 allowing the processor 2005 to connect to an external cloud 2500 for communicating with other devices in the cloud using e.g. an Ethernet protocol. The external cloud may e.g. be the Internet. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method of providing communication via a first communication interface over a first port of a first media access controller using first-type frames according to a first communication protocol the first media access controller having a first MAC buffer for storing at least one first-type frame in a first frame format according to the first communication protocol. The method may comprise detecting a start of a first-type frame provided to the first media access controller; upon detecting the start of the first-type frame, determining a first timestamp from a master clock signal provided from a master clock unit (MCLK1); and transferring a first-type frame between the first MAC buffer (RFE1; TFE1) and a first local memory (MEM1) in a block-wise manner, the first-type frame being hereby copied as a plurality of blocks. The method may comprise processing the plurality of blocks of the first-type frame using the first timestamp as determined from the master clock signal. In an embodiment, the transferring comprises a part of the processing and the transferring comprises, where a block of the plurality of blocks comprises a first-protocol specific timestamp-dependent information, processing the block to replace the first-protocol specific timestamp-dependent information in the block by the first-protocol specific timestamp-dependent information formatted in dependence on at least the first communication protocol and the time stamp.

For receiving a first-type frame, transferring the first-type frame between the first MAC buffer and the first local memory may comprise reading from the first MAC buffer and writing into the first local memory. For transmitting a first-type frame, transferring the first-type frame between the first MAC buffer and the first local memory may comprise reading from the first local memory and writing into the first MAC buffer.

Figure 12:
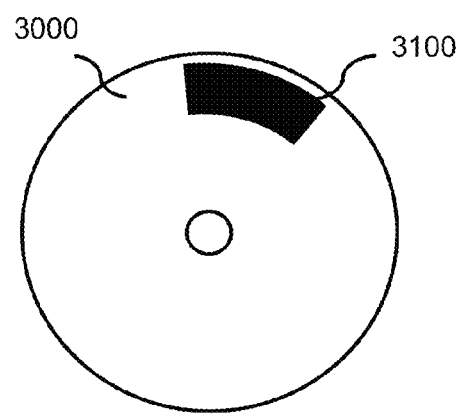
FIG. 12 shows a computer readable medium comprising a computer program product.

FIG. 12 shows a computer readable medium 3000 comprising a computer program product 3100, the computer program product 3100 comprising instructions for causing a processor apparatus to perform a method of providing communication via a first communication interface over a first port of a first media access controller using first-type frames according to a first communication protocol the first media access controller having a first MAC buffer for storing at least one first-type frame in a first frame format according to the first communication protocol. The method may comprise detecting a start of a first-type frame provided to the first media access controller; upon detecting the start of the first-type frame, determining a first timestamp from a master clock signal provided from a master clock unit (MCLK1); and transferring a first-type frame between the first MAC buffer (RFE1; TFE1) and a first local memory (MEM1) in a block-wise manner, the first-type frame being hereby copied as a plurality of blocks. Herein, the transferring may comprise, where a block of the plurality of blocks comprises a first-protocol specific timestamp-dependent information, processing the block using the first timestamp as determined from the master clock signal to replace the first-protocol specific timestamp-dependent information in the block by the first-protocol specific timestamp-dependent information formatted in dependence on at least the first communication protocol and the time stamp. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 12 as an optical disc, the computer readable medium 3000 may be any suitable computer readable medium, such as a hard disk, solid state memory, flash memory, etc., and may be non-recordable or recordable. The computer readable medium 3000 as may be a non-transitory tangible computer readable storage medium. The non-transitory tangible computer readable storage medium 3000 may comprising data loadable in a programmable apparatus, the data representing instructions executable by the programmable apparatus, said instructions comprising interface instructions for providing communication via a first communication interface over a first port of a first media access controller using first-type frames according to a first communication protocol. The interface instructions may comprise i) one or more receive instructions for repeatedly receiving new input data having a temporal input data resolution from the data source after having received earlier input data having the temporal input data resolution from the data source; (ii) one or more write instructions for writing the new input data in the data storage memory to data storage locations at the temporal input data resolution, the writing comprising, where earlier input data is already stored in the data storage memory, overwriting part of the earlier input data while keeping earlier input data satisfying a first pre-determined age criterion in the data storage memory at a first temporal aged data resolution, the first temporal aged data resolution being lower than the temporal input data resolution; (iii) one or more start detect instructions for detecting a start of a first-type frame provided to the first media access controller (MAC1); (iv) one or more timestamp instructions for, upon detecting the start of the first-type frame, determining a first timestamp from a master clock signal provided from a master clock unit (MCLK1); (v) one or more transfer instructions for transferring a first-type frame between the first MAC buffer (RFE1; TFE1) and a first local memory (MEM1) in a block-wise manner, the first-type frame being hereby copied as a plurality of blocks, and (vi) one or more process instructions comprising processing the plurality of blocks of the first-type frame using the first timestamp as determined from the master clock signal.

The transferring may comprise, where a block of the plurality of blocks comprises a first-protocol specific timestamp-dependent information, processing the block using the first timestamp as determined from the master clock signal to replace the first-protocol specific timestamp-dependent information in the block by the first-protocol specific timestamp-dependent information formatted in dependence on at least the first communication protocol and the time stamp.

The transferring may comprise, where the frame is determined to require a first-protocol specific timestamp-dependent information processing, processing of the frame using the first timestamp as determined from the master clock signal to process the frame in a first-protocol specific timestamp-dependent manner.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Furthermore, although the Figures and the discussion thereof describe exemplary information processing architectures, these exemplary architectures are presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of the interface systems described are circuitry located on a single integrated circuit or within a same device. Alternatively, interface systems may include any number of separate integrated circuits or separate devices interconnected with each other. For example, processor CPU1 may be located on a same integrated circuit as MACs MAC1, MAC2, MAC3 or on a separate integrated circuit or located within another peripheral or slave discretely separate from other elements of interface system MPDEV1. External MAC devices MACEXT be located on the same, or may also be located on separate integrated circuits or devices as the processor CPU4 and/or the other MACs. Any of the interface devices described herein MPDEV1, MPDEV2, MPDV3, MPDEV4 may be a semiconductor device. Any of the interface devices described herein MPDEV1, MPDEV2, MPDV3, MPDEV4 may be part of a larger device, the larger device may be a semiconductor device. Also for example, embodiments of the interface system or portions thereof may be soft or code representations of physical circuitry or of logical representations convertible into physical circuitry. As such, part or all of interface systems IFS1, IFS2, IFS3, IFS4, multi-port devices MPDEV1, MPDEV2, MPDEV3, MPDEV4 and/or single-port device SPDEV1 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 2000, for example, from computer readable media such as memory or other media on other computer systems. Such computer readable media may be permanently, removably or remotely coupled to an information processing system such as system 2000. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system.

A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An interface system, comprising:
a first media access controller for providing a first communication interface over a first port using first-type frames according to a first communication protocol, the first media access controller having a first MAC buffer for storing at least one first-type frame in a first frame format according to the first communication protocol,
a time synchronization module arranged to:
detect a start of a first-type frame provided to the first media access controller,
upon detecting the start of the first-type frame, determine a first timestamp from a master clock signal provided from a master clock unit, latch the first timestamp into a first timestamp register in the time synchronization module and keep the first timestamp in the first timestamp register at least until a start of a next first-type frame is detected, and
a processor having a first local memory and being arranged to:
retrieve the first timestamp from the first timestamp register,
transfer a first-type frame between the first MAC buffer and the first local memory in a block-wise manner, the first-type frame being hereby copied as a plurality of blocks, and
process the plurality of blocks of the first-type frame using the first timestamp as retrieved from the first timestamp register, and
a second media access controller for providing a second communication interface over a second port using second-type frames according to a second communication protocol, the second media access controller having a second MAC buffer for storing at least one second-type frame in a second frame format according to the second communication protocol, and
the time synchronization module further arranged to:
detect a start of a second-type frame provided to the second media access controller,
upon detecting the start of the second-type frame, determine a second timestamp from a master clock signal provided from a master clock unit, latch the second timestamp into a second timestamp register in the time synchronization module and keep the second timestamp in the second timestamp register at least until a start of a next second-type frame is detected,
the processor having a second local memory and further arranged to:
retrieve the second timestamp from the second timestamp register,
transfer a second-type frame between the second MAC buffer and the second local memory in a block-wise manner, the second-type frame being hereby copied as a plurality of blocks,
process the plurality of blocks of the second-type frame using the second timestamp as retrieved from the second timestamp register.

2. An interface system according to claim 1, the time synchronization module being arranged to, in detecting a start of the first-type frame, detect a providing of the start of first-type frame to the first port of the first media access controller.

3. An interface system according to claim 1, the time synchronization module being arranged to, in latching first timestamp into the first timestamp register, format the first timestamp according to the first communication protocol.

4. An interface system according to claim 1, the processor being arranged to, in retrieving the first timestamp from the first timestamp register, format the first timestamp according to the first communication protocol.

5. An interface system according to claim 1,
the first MAC buffer comprising a first MAC transmit buffer,
the first port comprising a first transmit port,
the first media access controller being arranged to transmit first-type frames from the first MAC transmit buffer via the first transmit port, and
the processor being arranged to, in transferring the first-type frame between the first MAC transmit buffer and the first local memory in a block-wise manner, and as part of processing the plurality of blocks of the first-type frame using the first timestamp as retrieved from the first timestamp register:
provide a segmentation of the first-type frame in the first local memory into a plurality of blocks,
for each block of the plurality of blocks:
read the block from the first local memory,
where the block comprises a first-protocol specific timestamp-dependent information, process the block using the first timestamp as retrieved from the first timestamp register to replace the first-protocol specific timestamp-dependent information in the block by the first-protocol specific timestamp-dependent information formatted in dependence on at least the first communication protocol and the time stamp,
write the block into the first MAC transmit buffer.

6. An interface system according to claim 1,
the first MAC buffer comprising a first MAC receive buffer,
the first port comprising a first receive port,
the first media access controller being arranged to receive first-type frames in the first MAC receive buffer via the first receive port, and
the processor being arranged to, in transferring the first-type frame between the first MAC buffer and the first local memory in a block-wise manner, and as part of processing the plurality of blocks of the first-type frame using the first timestamp as retrieved from the first timestamp register:
for each block of the plurality of blocks corresponding to the first-type frame from the first MAC receive buffer:
read the block from the first MAC receive buffer,
where the block comprises a first-protocol specific timestamp-dependent information, process the block using the first timestamp as retrieved from the first timestamp register to replace the first-protocol specific timestamp-dependent information in the block by the first-protocol specific timestamp-dependent information formatted in dependence on at least the first communication protocol and the time stamp, and
write the block into the first local memory.

7. An interface system according to claim 1, the time synchronization module and/or the processor being arranged to run on the master clock signal or a clock signal derived from the master clock signal.

8. An interface system according to claim 1, the interface system comprising a interface device, the interface device comprising the first media access controller,
the interface device further comprising or being arranged to cooperate with the time synchronization module, and
the interface device further comprising or being arranged to cooperate with the master clock unit,
the interface device further comprising or being arranged to cooperate with the processor.

9. An interface system according to claim 8, the interface device comprising the master clock unit.

10. An interface system according to claim 8, the first media access controller comprising the master clock unit.

11. An interface system according to claim 8, the master clock unit being external to the interface device.

12. An interface system according to claim 1, the first communication protocol and the second communication protocol being different communication protocols.

13. An interface system according to claim 1, the first communication protocol and the second communication protocol being the same communication protocol.

14. An interface system according to claim 1, at least one of the first and the second communication protocol being one of the group consisting of Ethernet, IEEE 1588, Industrial Ethernet including EtherCAT, ProfiNET and IEC 62439, PROFIBUS, CAN, HDLC, I2C, USB.

15. A time synchronization module for an interface system according to claim 1, the time synchronization module arranged to:
detect a start of a first-type frame provided to the first media access controller, and
upon detecting the start of the first-type frame, determine a first timestamp from a master clock signal provided from a master clock unit, latch the first timestamp into a first timestamp register in the time synchronization module and keep the first timestamp in the first timestamp register at least until a start of a next first-type frame is detected.

16. An interfacing method, comprising:
providing communication via a first communication interface over a first port of a first media access controller using first-type frames according to a first communication protocol, the first media access controller having a first MAC buffer for storing at least one first-type frame in a first frame format according to the first communication protocol, and via a second communication interface over a second port of a second media access controller using second-type frames according to a second communication protocol, the second media access controller having a second MAC buffer for storing at least one second-type frame in a second frame format according to the second communication protocol,
detecting a start of a first-type frame provided to the first media access controller, —upon detecting the start of the first-type frame, determining a first timestamp from a master clock signal provided from a master clock unit,
transferring the first-type frame between the first MAC buffer and a first local memory in a block-wise manner, the first-type frame being hereby copied as a plurality of blocks, and
processing the plurality of blocks of the first-type frame using the first timestamp as determined from the master clock signal:
detecting a start of a second-type frame provided to the second media access controller,
upon detecting the start of the second-type frame, determining a second timestamp from the master clock signal provided from the master clock unit,
transferring the second-type frame between the second MAC buffer and a second local memory in the block-wise manner, the second-type frame being hereby copied as a plurality of blocks, and
processing the plurality of blocks of the second-type frame using the second timestamp as determined from the master clock signal.

17. A computer program product comprising: A non-transitory computer-readable medium having instructions stored thereon executable by a processor to perform a method of communication as claimed in claim 16.

18. A non-transitory tangible computer readable storage medium comprising data loadable in a programmable apparatus, the data representing instructions executable by the processor of the programmable apparatus, said instructions comprising:

interface instructions for providing communication via a first communication interface over a first port of a first media access controller using first-type frames according to a first communication protocol, and for providing communication via a second communication interface over a second port of a second media access controller using second-type frames according to a second communication protocol, i. one or more receive instructions for repeatedly receiving new input data having a temporal input data resolution from the data source after having received earlier input data having the temporal input data resolution from the data source; and ii. one or more write instructions for writing the new input data in the data storage memory to data storage locations at the temporal input data resolution, the writing comprising, where earlier input data is already stored in the data storage memory, overwriting part of the earlier input data while keeping earlier input data satisfying a first pre-determined age criterion in the data storage memory at a first temporal aged data resolution, the first temporal aged data resolution being lower than the temporal input data resolution, iii. one or more start detect instructions for detecting a start of a first-type frame provided to the first media access controller, iv. one or more timestamp instructions for, upon detecting the start of the first-type frame, determining a first timestamp from a master clock signal provided from a master clock unit, v. one or more transfer instructions for transferring a first-type frame between the first MAC buffer and a first local memory in a block-wise manner, the first-type frame being hereby copied as a plurality of blocks:

vi. one or more process instructions comprising processing the plurality of blocks of the first-type frame using the first timestamp as determined from the master clock signal vii. one or more start detect instructions for detecting a start of a second-type frame provided to the second media access controller, viii. one or more timestamp instructions for, upon detecting the start of the second-type frame, determining a second timestamp from the master clock signal provided from the master clock unit, ix. one or more transfer instructions for transferring a second type-frame between the first MAC buffer and a second local memory in a block-wice manner, the second-type frame being hereby copied as a plurality of blocks.

* * * * *